US012737566B2

(12) United States Patent
Hale et al.

(10) Patent No.: US 12,737,566 B2
(45) Date of Patent: Sep. 15, 2026

(54) ADVANCED MACHINE LEARNING METHODS FOR ENHANCED CALL TRANSCRIPT ANNOTATION AND TARGETED ANALYTICS REPORT GENERATION

(71) Applicant: Wells Fargo Bank, N.A., San Francisco, CA (US)

(72) Inventors: Nathaniel J. Hale, New York, NY (US); Rameshchandra Bhaskar Ketharaju, Hyderabad (IN); Ananth Kendapadi, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 203 days.

(21) Appl. No.: 18/615,275

(22) Filed: Mar. 25, 2024

(65) Prior Publication Data

US 2025/0298997 A1 Sep. 25, 2025

(51) Int. Cl.

| | |
|---|---|
| ***G06F 40/58*** | (2020.01) |
| ***G06F 18/2415*** | (2023.01) |
| *G06F 40/169* | (2020.01) |
| *H04M 3/42* | (2006.01) |

(52) U.S. Cl.

CPC .......... *G06F 40/58* (2020.01); *G06F 18/2415* (2023.01); *G06F 40/169* (2020.01); *H04M 3/42221* (2013.01)

(58) Field of Classification Search

None

See application file for complete search history.

(56) References Cited

U.S. PATENT DOCUMENTS

| | | | | |
|---|---|---|---|---|
| 9,208,502 | B2 | 12/2015 | Parikh | |
| 10,755,195 | B2 | 8/2020 | Motahari Nezhad | |
| 2021/0157834 | A1 | 5/2021 | Sivasubramanian | |
| 2021/0375289 | A1* | 12/2021 | Zhu | G06F 40/253 |
| 2021/0375291 | A1* | 12/2021 | Zeng | G06F 16/345 |
| 2022/0343250 | A1* | 10/2022 | Tremblay | G06F 3/0482 |
| 2022/0377174 | A1 | 11/2022 | Dwyer | |

* cited by examiner

*Primary Examiner* — Jau Shya Meng

(74) *Attorney, Agent, or Firm* — K&L Gates LLP

(57) ABSTRACT

A method includes receiving a call transcript, wherein the call transcript is associated with transcript metadata. The method further includes determining one or more annotations for the call transcript. The method further includes annotating the call transcript with the one or more annotations. The method further includes storing the annotated call transcript in a history recorder repository. The method further includes identifying an analytics inquiry comprising one or more attributes of interest, wherein an attribute of interest corresponds to one or more annotations. The method further includes selecting one or more annotated call transcripts based on the one or more attributes of interest. The method further includes generating a targeted analytics report based on the selected one or more annotated call transcripts, and providing the targeted analytics report.

20 Claims, 12 Drawing Sheets

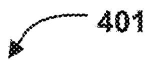

Caller: Hola, soy Jane. I'm having problemas accessing my account.

Agent: Sorry to hear that. Could you provide more details?

Caller: When I try to login, it says my credentials are invalid.

Agent: Can you confirm the username you're using?

Caller: Esta jane@abc.com

Agent: Thanks. […] Could you try resetting your password?

Caller: De acuerdo. […] Yes, it worked, de nada.

Agent: If you encounter further issues, please don't hesitate to contact us.

FIG. 4A

| **Annotation type(s):** | **Annotations:** |
| ---: | --- |
| Gender: | female caller; male agent; |
| Identity Verification: | identity verified; |
| Language: | English; Spanish |
| Issue Type: | Account Login Issue; |
| Resolution: | Reset Solution; Positive Outcome; |
| Agent Behavior: | Friendly Reassurance |

Targeted Analytics Report 1002

| Month | % Change (Spanish) | % Change (English) |
|---|---|---|
| January | - | - |
| February | 41.7% | -35.3% |
| March | 29.4% | 163.6% |
| April | -36.4% | -65.5% |
| May | -14.3% | 70.0% |
| June | 58.3% | -11.8% |
| July (Projected) | 57.9% | -23.5% |

ADVANCED MACHINE LEARNING METHODS FOR ENHANCED CALL TRANSCRIPT ANNOTATION AND TARGETED ANALYTICS REPORT GENERATION

BACKGROUND

Data analytics systems encompass a set of methodologies, technologies, and tools that are designed to analyze, interpret, and derive meaningful insights from data. Such systems allow organizations to make informed decisions, identify opportunities, and optimize strategies across diverse domains such as business, finance, healthcare, and more.

BRIEF SUMMARY

Data analytics systems often use various statistical and mathematical techniques to uncover patterns, trends, and correlations within datasets. Traditional methods of data analysis typically include hypothesis testing, chi-square tests, and using basic reporting techniques (e.g., charts, graphs, dashboards). However, in the modem digital age and with the ever-increasing volume of data, it has become increasingly important to implement robust data analytics systems capable of providing various data insights despite the large volume of potentially relevant data. Failure to glean such insights early on may result in the continued propagation of these issues within the institution that could otherwise be caught and addressed in the early stages. Furthermore, once an issue is determined, if sophisticated data analytic techniques are not employed, it can be difficult to identify relevant institution data sufficiently related to the issue, which may result in costly expenditure of manual, financial, and computational resources. To avoid these and other issues, it's crucial that institutions implement a data analytics system that both pre-emptively processes data to set the stage for future data processing and further, allows for robust data analysis of the processed data.

Transforming the platforms of human interaction, the current digital landscape for service-based entities is characterized by a surge in remote interactions and heightened reliance on phone-based assistance, as a result of which entities are grappling with a notable uptick in the volume of user calls. The shift towards digital channels has amplified the demand for remote support, contributing to a substantial increase in the number of calls received by these entities. However, these entities continue to demonstrate a strong dependency on manual methods to manage and analyze the volume and variability of data associated with such calls. In fact, manual data analysis remains a daunting and time-consuming task that render these entities incapable of generating nuanced insights from the gathered data. As such, there is a unique need for a technical solution that addresses these challenges and leverages the capabilities of a large language model to reduce the need for manual data analysis, accelerate the identification of critical information, allow for prompt data-driven decision making and targeted interventions, all of which would enhance operational agility and conserve time and resources for more dire operational needs. Accordingly, there exists an underlying technical necessity for systems that are able to autonomously provide this capability.

Example implementations described herein provide a technical solution to this technical problem, and in doing so, overcome the challenges presented by the manual analysis of call data in generating targeted insights. Example embodiments described herein require a targeted analytics report generation system including an annotation model and an analytics model. Upon receiving a call transcript, an annotation model may process a call transcript to determine one or more annotations and may further annotate the call transcript with the one or more determined annotations. The annotated call transcript may then be stored in a history recorder repository and may be identified and analyzed in future analytics inquiries. In doing so, the annotation model may prepare the call transcript and effectively set-the stage for future data analytics insights that may utilize the call transcript. In particular, the annotation model may be a large language model that is capable of consideration of terms included in the call transcript, the contextual information surrounding the terms, and a deeper analysis of the call transcript as a whole to determine the one or more annotations for the call transcript. Furthermore, the annotation model may be trained to determine annotations that are responsive to attributes of interest for the particular institution. As such, the annotation model may provide for enhanced call transcript annotation and in doing so, may allow for reduced expenditure of manual, financial, and computational resources associated with identifying relevant call transcripts for future analytics inquiries.

In addition, example embodiments described herein may use the targeted analytics report generation system to identify an analytics inquiry comprising one or more attributes of interest and select the one or more annotated call transcripts stored in the history recorder repository based on the one or more attributes of interest. In particular, the annotated call transcripts may be identified based on the annotations associated with the annotated call transcripts and the one or more attributes of interest included in the analytics inquiry. Thus, only relevant annotated call transcripts are identified and used to generate the targeted analytics report. Based on the selected annotated call transcripts, the targeted analytics report generation system may generate a targeted analytics report and provide the targeted analytics user to entity affiliated personnel. Further, example embodiments described herein may be useful in a range of sectors (e.g., financial, healthcare, border security, etc.), and may be used by a variety of establishments (e.g., financial institutions, hospitals, the U.S. Department of Homeland Security, etc.) for which generating timely and actionable insights from user calls is of great importance. Further, an entity may use example embodiments described herein to reduce user wait times, thereby allowing entities to enhance operational efficiency and improve service experience for users. Such entities may also directly benefit from resource optimization, as the targeted analytics report generation system may be tailored to fit their specific data analysis needs and be seamlessly integrated into their existing IT infrastructure.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale.

Some embodiments may include fewer or more components than those shown in the figures.

FIG. 4A illustrates the receipt of an example call transcript, in accordance with some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
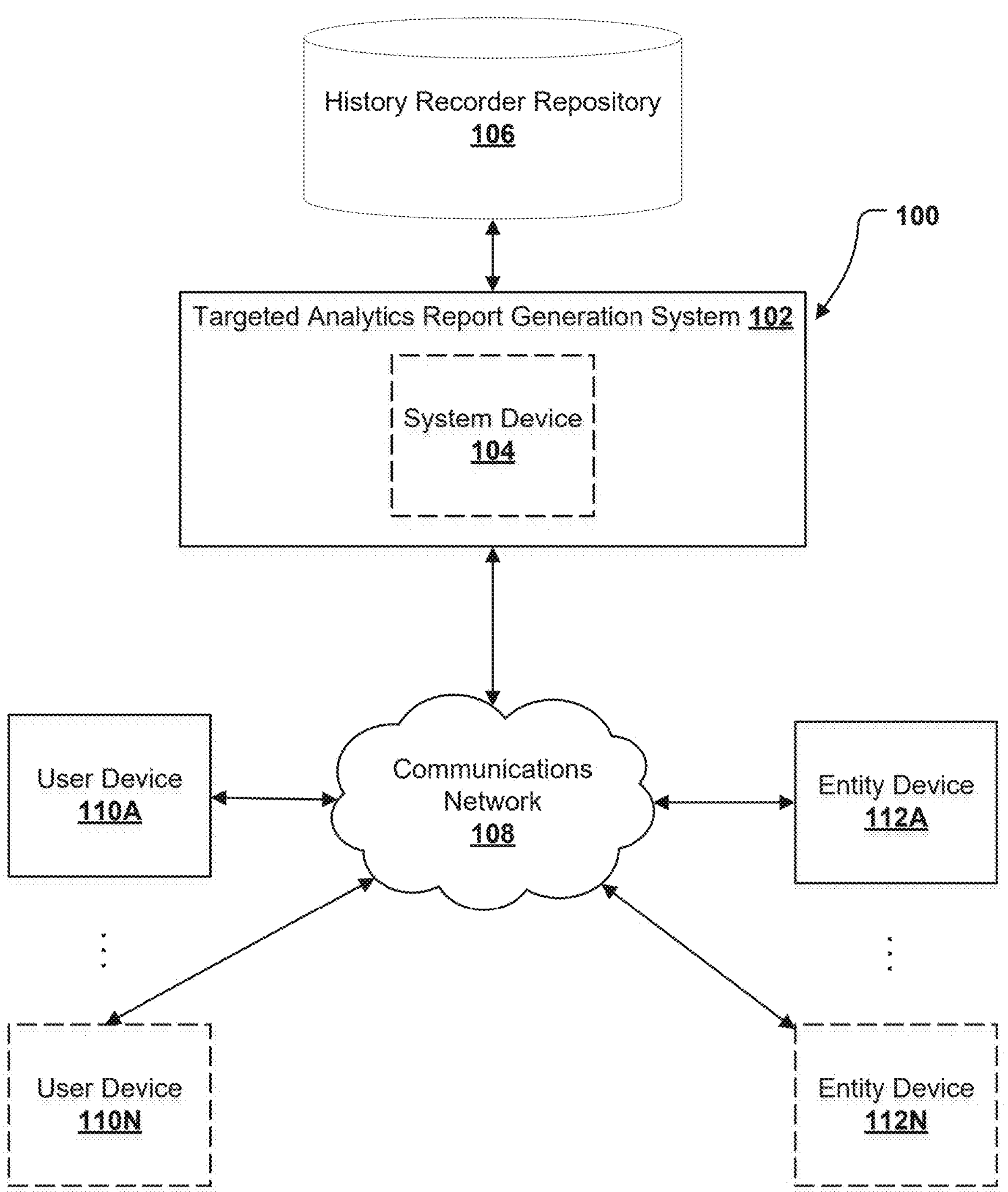
FIG. 1 illustrates a system in which some example embodiments may be used for generation of a targeted analytics report.

Example embodiments described herein may be implemented using any of a variety of computing devices or servers. To this end, FIG. 1 illustrates an example environment 100 within which various embodiments may operate. As illustrated, a targeted analytics report generation system 102 may receive and/or transmit information via communications network 108 (e.g., the Internet) with any number of other devices, such as one or more of user devices 110A-110N and/or entity devices 112A-112N. Although system device 104 and history recorder repository 106 are described in singular form, some embodiments may utilize more than one system device 104, more than one history recorder repository 106, and/or the like. The one or more user devices 110A-110N and the one or more entity devices 112A-112N may be embodied by any computing devices known in the art. The one or more user devices 110A-110N and the one or more entity devices 112A-112N need not themselves be independent devices but may be peripheral devices coupled to other computing devices. A user device 110A-110N may include laptops, tablets, phones, whereas an entity device 112A-112N may be a device associated with an entity (e.g., an organization) that performs functions related to data management, implementation of security measures, communication facilitations, and other operations specific to the needs of the particular entity.

The targeted analytics report generation system 102 may be implemented as one or more computing devices or servers, which may be composed of a series of components. These components of system device 104 may be physically proximate to the other components of the targeted analytics report generation system 102 while other components are not. The system device 104 may receive, process, generate, and transmit data, signals, and electronic information to facilitate the operations of the targeted analytics report generation system 102. Particular components of the targeted analytics report generation system 102 are described in greater detail below with reference to apparatus 200 in connection with FIG. 2.

In some embodiments, the targeted analytics report generation system 102 further includes a history recorder repository 106 that comprises a distinct component from other components of the targeted analytics report generation system 102. History recorder repository 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). History recorder repository 106 may host the software executed to operate the targeted analytics report generation system 102. History recorder repository 106 may store information relied upon during operation of the targeted analytics report generation system 102, such as annotated call transcripts that may be used by the targeted analytics report generation system 102, data and documents to be analyzed using the targeted analytics report generation system 102, or the like. In addition, history recorder repository 106 may store control signals, device characteristics, and access credentials enabling interaction between the targeted analytics report generation system and one or more of the user devices 110A-110N or entity devices 112A-112N.

Although FIG. 1 illustrates an environment and implementation in which the targeted analytics report generation system 102 interacts indirectly with a user via one or more of user devices 110A-110N and/or entity devices 112A-112N, in some embodiments users may directly interact with the targeted analytics report generation system 102 (e.g., via communications hardware of the targeted analytics report generation system 102), in which case a separate user device 110A-110N and/or entity device 112A-112N may not be utilized. Whether by way of direct interaction or indirect interaction via another device, a user may communicate with, operate, control, modify, or otherwise interact with the targeted analytics report generation system 102 to perform the various functions and achieve the various benefits described herein.

Example Implementing Apparatuses

Figure 2:
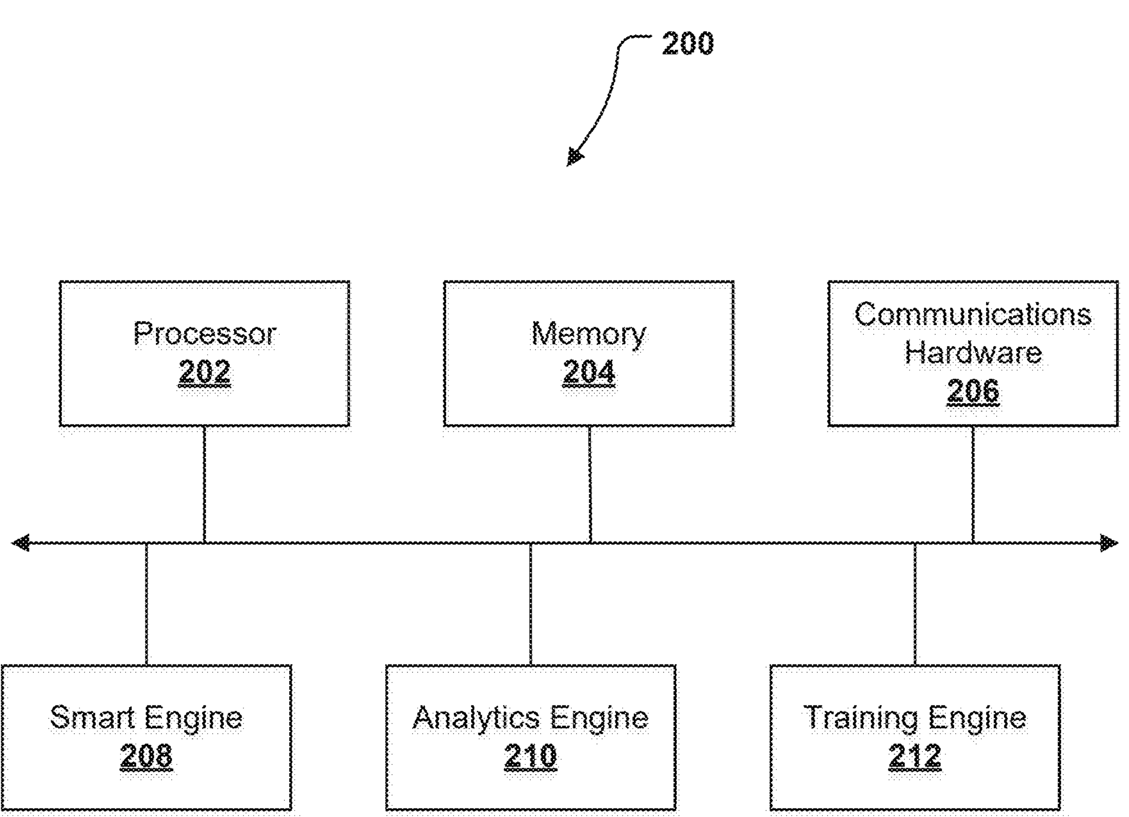
FIG. 2 illustrates a schematic block diagram of example circuitry embodying a system device that may perform various operations in accordance with some example embodiments described herein.

The targeted analytics report generation system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-10. As illustrated in FIG. 2, the apparatus 200 may include processor 202, memory 204, communications hardware 206, smart engine 208, analytics engine 210, and training engine 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a smart engine 208 that (i) determines, using an annotation model, one or more annotations for the call transcript, (ii) annotates, using the annotation model, one or more annotations for the call transcript, and (iii) stores the annotated call transcript in a history recorder repository 106, wherein the history recorder repository 106 comprises one or more annotated call transcripts. The smart engine 208 may utilize processor 202, memory 204, or any other hardware component included in the apparatus 200 to perform these operations, as described in connection with FIGS. 3-4C below. The smart engine 208 may further utilize communications hardware 206 to gather data from a variety of sources (e.g., user devices 110A-110N or entity devices 112A-112N, as shown in FIG. 1), and/or exchange data with a user, and in some embodiments may utilize processor 202 and/or memory 204 to determine whether an annotation determined for the call transcript corresponds to a flagged annotation.

In addition, the apparatus 200 further comprises an analytics engine 210 that (i) identifies an analytics inquiry, wherein the analytics inquiry comprises one or more attributes of interest, wherein an attribute of interest corresponds to one or more annotations, (ii) selects, using an analytics model, one or more annotated call transcripts based on the one or more attributes of interest, and (iii) generates, using the analytics model, a targeted analytics report based on the selected one or more annotated call transcripts. The analytics engine 210 may utilize processor 202, memory 204, or any other hardware component included in the apparatus 200 to perform these operations, as described in connection with FIGS. 9-10 below. The analytics engine 210 may further utilize communications hardware 206 to gather data from a variety of sources (e.g., user devices 110A-110N or entity devices 112A-112N as shown in FIG. 1), and/or exchange data with a user, and in some embodiments may utilize processor 202 and/or memory 204.

Further, the apparatus 200 further comprises a training engine 212 that (i) trains the annotation model using a training routine, wherein the training routine comprises initializing a base annotation model and fine-tuning the base annotation model using a training subset, wherein the training subset comprises (a) annotated historical call transcripts, (b) each annotated call transcript is annotated with one or more ground-truth annotations, and (c) each ground truth annotation corresponds to one or more attributes of interest, (ii) receives one or more annotated historical call transcripts, (iii) partitions the one or more received annotated historical call transcripts into a training subset and a validation subset, (iv) fine-tunes, using the validation subset, the annotation model by performing a refinement routine, wherein the refinement routine comprises generating, using the annotation model, one or more model-generated annotations for a historical call transcript in the validation subset, (v) fine-tunes the annotation model based on a comparison of the one or more model-generated annotations and one or more ground-truth annotations for the historical call transcript in the validation subset, (vi) fine-tunes, using the validation subset, the annotation model by performing a feedback routine, wherein the feedback routine comprises generating, using the annotation model, one or more model-generated annotation for a historical call transcript in the validation subset and fine-tunes, using the annotation model, the annotation model based on feedback of entity affiliated personnel. The training engine 212 may utilize processor 202, memory 204, or any other hardware component included in the apparatus 200 to perform these operations, as described in connection with FIGS. 3 and 5-8 below. The training engine 212 may further utilize communications hardware 206 to gather data from a variety of sources (e.g., user devices 110A-110N or entity devices 112A-112N, as shown in FIG. 1), and/or exchange data with a user, and in some embodiments may utilize processor 202 and/or memory 204.

Although components 202-212 are described in part using functional language, it will be understood that the particular implementations necessarily include the use of particular hardware. It should also be understood that certain of these components 202-212 may include similar or common hardware. For example, the smart engine 208, analytics engine 210, and training engine 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "engine" with respect to elements of the apparatus therefore shall be interpreted as necessarily including the particular hardware configured to perform the functions associated with the particular element being described. Of course, while the terms "engine" should be understood broadly to include hardware, in some embodiments, the terms "engine" may in addition refer to software instructions that configure the hardware components of the apparatus 200 to perform the various functions described herein.

Although the smart engine 208, analytics engine 210, and training engine 212 may leverage processor 202, memory 204, or communications hardware 206 as described above, it will be understood that any of smart engine 208, analytics engine 210, and training engine 212 may include one or more dedicated processor, specially configured field programmable gate array (FPGA), a tensor processing unit (TPU), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that smart engine 208, analytics engine 210, and training engine 212 comprise particular machinery designed for performing the functions described herein in connection with such elements of apparatus 200.

In some embodiments, various components of the apparatuses 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts, schematic block diagrams, and graphical user interfaces and flowcharts.

Example Operations

Turning to FIGS. 3-10, example flowcharts are illustrated that contain example operations implemented by example embodiments described herein. The operations illustrated in FIGS. 3-10 may, for example, be performed by system device 104 of the targeted analytics report generation system 102 as shown in FIG. 1, which may in turn be embodied by an apparatus 200, which is shown and described in connection with FIG. 2. To perform the operations described below, the apparatus 200 may utilize one or more of processor 202, memory 204, communications hardware 206, smart engine 208, analytics engine 210, training engine 212, and/or any combination thereof. It will be understood that user interaction with the targeted analytics report generation system 102 may occur directly via communications hardware 206 or may instead be facilitated by a separate user device 110A-110N and/or entity device 112A-112N, as shown in FIG. 1, and which may have similar or equivalent physical componentry facilitating such user interaction.

Example Operations for Annotating a Call Transcript

Figure 3:
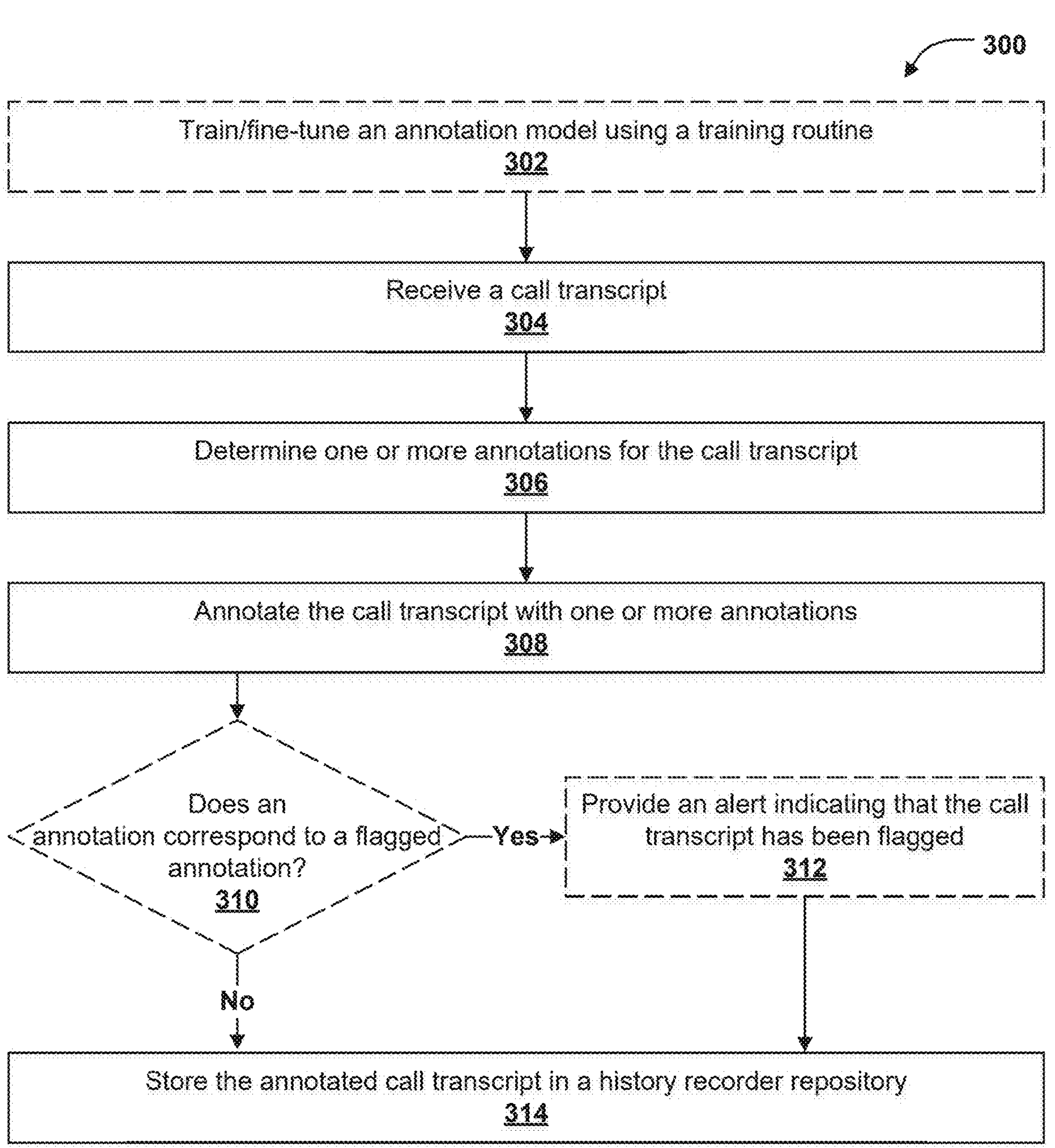
FIG. 3 illustrates an example flowchart for annotating a call transcript with one or more annotations, in accordance with some example embodiments described herein.

Turning first to FIG. 3, a procedure 300 illustrates example operations for annotating a call transcript and storing an annotated call transcript in a history recorder repository 106, wherein the history recorder repository 106 comprises one or more annotated call transcripts. The apparatus 200 includes means, such as processor 202, memory 204, communications hardware 206, smart engine 208, analytics engine 210, training engine 212, or the like for storing an annotated call transcript in a history recorder repository 106, wherein the history recorder repository 106 comprises one or more annotated call transcripts. A history recorder repository refers to a storage system that archives annotated call transcripts, preserving a record of communication history between a service provider and a service user (e.g., a call agent and a corresponding user). A call transcript refers to a written record of conversation conducted over the phone, typically presented in a text format. In other words, a call transcript captures the spoken words of the participants, allowing for documentation and analysis of the communication.

Optionally, as shown by operation 302, the apparatus 200 includes means, such as processor 202, memory 204, training engine 212, or the like, for training and/or fine-tuning an annotation model using a training routine. The training engine 212 may train or fine-tune the annotation model prior to performing operations 304-314. Training and/or fine-tuning of the annotation model is described in further detail in FIG. 5.

As shown by operation 304, the apparatus 200 includes means, such as communications hardware 206, smart engine 208, or the like, for receiving a call transcript, wherein the call transcript is associated with transcript metadata. Transcript metadata refers to the contextual details associated with a call transcript, such as timestamps (e.g., time and date of each segment within the call transcript), speaker identification, call duration, call purpose, actionable items (e.g., tasks assigned to a user during the call), call outcome (e.g., positive, negative, etc.), and/or the like. The transcript metadata offers a comprehensive overview of the call transcript and may further enable efficient retrieval and analysis of pertinent information.

In some embodiments, a call may be received by the entity device 112A-112N (e.g., a user initiates a call and calls an agent), whereas in alternate embodiments, the call may be received by the user device 110A-110N (e.g., an agent initiates a call and calls a user). An entity refers to a digital and/or a physical brick-and-mortar establishment such as a business entity, an organization, a commercial entity, and/or the like. Examples of entities may include financial institutions, hospitals, schools, grocery stores, and/or the like. A user may refer to an individual to whom an entity offers services and/or an individual that has an account managed by the entity.

In some embodiments, communications hardware 206 may receive a call transcript in real-time or substantially real-time such that the call transcript is received while the call is ongoing. In this case, the communications hardware 206 may utilize smart engine 208 to process the call transcript in real time. The smart engine be equipped with signaling and/or monitoring mechanisms that are able to interpret call signaling protocols used in telecommunication networks. This may include protocols such as SIP (Session Initiation Protocol) for Voice over Internet Protocol (VoIP) calls or signaling used in traditional telephone systems. When a call is initiated, the signaling protocol may be used to detect and communicate the occurrence of the call, allowing the communications hardware 206 to identify and track active call sessions. In some embodiments, the communications hardware 206 may continuously monitor the audio stream during the call, which may involve analyzing the incoming audio for speech patterns and relevant signals (e.g., silence detection, voice activity detection, etc.). In particular, the communications hardware 206 may use real-time audio processing and speech-to-text technology that offers live transcription capabilities and converts spoken words into text in real-time or near-real-time. In alternate embodiments, communications hardware 206 may use the aforementioned example technology to convert speech into text after the completion of a conversation.

In some embodiments, the smart engine 208 may deploy a silence detection algorithm to recognize periods of silences between speech segments. The absence of audio signals during these pauses may indicate the end of a spoken segment, helping in segmenting the call for transcription and metadata association. In addition, the communications hardware 206 may monitor the connection status of the call with the telecommunication network (e.g., communications network 108). An active and established connection may indicate that a call is ongoing, whereas an inactive connection may indicate that there is no ongoing call or that an ongoing call has completed. Monitoring such changes in connection may allow the communications hardware 206 to identify the start and end of calls, and accordingly trigger the selected speech-to-text technology to begin transcribing the call.

During an ongoing call or upon completion of a call, the communications hardware 206 may transform the analog signals (e.g., sound) into a digital format composed of discrete numerical value, and apply digital signal processing (DSP) techniques for quality and clarity enhancement. DSP algorithms may include noise reduction, echo cancellation, and/or other audio processing techniques that filter out unwanted background noise, ensuring that the recorded audio is clear and intelligible. In some embodiments, the recorded audio may be saved in a specific file format (e.g., WAV, mp3, etc.), depending on the requirements and standards set forth by the particular entity hosting the targeted analytics report generation system 102 and the associated history recorder repository 106 in which the audio file and its corresponding transcript may be stored.

An example call transcript is illustrated in FIG. 4A. Turning now to FIG. 4A, the communications hardware 206 has received an example call transcript 401 of a completed call. In this example scenario, the communications hardware 206 performed an analog-to-digital conversion of the audio signals to generate a digital audio file of the recorded call. Once generated, the audio file of the recorded call is ingested by a speech-to-text technology software that has generated the example call transcript 401. In this particular scenario, a user (i.e., caller) has called an entity (i.e., agent) for account login assistance.

Returning, to FIG. 3, as shown by operation 306, the apparatus 200 includes means, such as smart engine 208, or the like, for determining, using an annotation model, one or more annotations for the call transcript. Examples of annotations include person names and roles (e.g., caller vs. agent), gender identification (e.g., male vs. female), caller identity confirmation, language(s) spoken during the call, identification of issue, resolution type, sentiment analysis of caller and/or agent, perceived customer satisfaction level, product or services discussed, call duration, call outcome, agent's behavior, escalation type, follow-up actions, and/or the like. These examples demonstrate the diversity of annotation types that a smart engine 208, in conjunction with an annotation model, may apply to a call transcript to capture various aspects of the conversation for further analysis and insights. Generally, the specific annotation types chosen for a particular call transcript may depend on the attributes of interest used to train the annotation model, as described in further detail in FIG. 5. As the smart engine 208 operates in conjunction with an annotation model, here, the annotation model refers to a pre-trained large language model (e.g., GPT-3, a bidirectional encoder representations from transformers (BERT) model, etc.) that can infer context and patterns in language, making them useful for analyzing call transcripts. Further, the annotation model may be trained on a predefined set of annotations, which may be predefined by a subject matter expert. The process of training the annotation model is further described in connection with FIGS. 5-8 below.

In some embodiments, the smart engine 208 may pre-process the call transcript by (i) text cleaning (e.g., removing unnecessary characters, punctuation, or symbols that might interfere with the analysis and ensuring consistency in formatting, spelling correction, etc.), (ii) normalization (e.g., standardizing the text to a common format such as by converting all text to lowercase to ensure case-sensitive analysis), (iii) tokenization (e.g., breaking the text into individual words or tokens to allow for further analysis of each individual segment), and/or the like. Following the pre-processing step, the smart engine 208 may operate in conjunction with the annotation model for further token-level analysis. To do this, the annotation model may examine each word or group of words independently, and subsequently extract features from the tokens, considering linguistic patterns, context, semantic meaning, and/or the like. For instance, an annotation model identifying names might look for capitalized pronouns in the call transcript. In some embodiments, the annotation model may deploy pattern-matching algorithms or statistical models to recognize instances of specified annotations. Machine learning techniques such as named entity recognition (NER) models are commonly used for this purpose. In addition, the annotation model may analyze the context of each token in the call transcript to improve accuracy by considering the words surrounding a token to discern its meaning. For instance, the annotation model may interpret the word "May" in a call transcript as being associated with a month or a person's name based on the context. The annotation model may identify prefixes (e.g., Ms., Mr., Dr., or the like) that precede the user's name in the call transcript to act as context. In some embodiments, the annotation model may employ probabilistic methods (e.g., Bayesian approaches or machine learning models with probabilistic outputs) to infer the likelihood of a token belonging to a specific category. The combination of preprocessing the call transcript and applying the annotation model ensures that the call transcript is in a suitable format for analysis, but also that the annotation model can accurately identify instances of specified annotations. In some embodiments, the annotation model may be regularly trained and refined over time as the data patterns associated with the call transcripts continue to evolve.

Figure 4B:
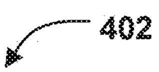
FIG. 4B illustrates an example annotated call transcript of FIG. 4A, in accordance with some example embodiments described herein.

An example of the annotations of a call transcript is illustrated in FIG. 4B. Turning now to FIG. 4B, an example annotation summary 402 is displayed, in which the smart engine 208, in conjunction with the annotation model has analyzed the call transcript using a predefined set of annotation types (gender, identity verification, language, issue type, resolution, agent behavior, etc.) to determine the one or more corresponding annotations associated with the call transcript. In some embodiments, the smart engine 208 may analyze the call transcript for particular annotation types as requested by an entity representative, and/or as predefined by the targeted analytics report generation system 102. In some embodiments, the smart engine 208 may also generate the call transcript annotation summary as shown in FIG. 4B to provide to the entity device 112A-112N for further analysis.

Returning to FIG. 3, as shown by operation 308, the apparatus 200 includes means, such as smart engine 208, or the like, for annotating, using the annotation model, the call transcript with one or more annotations. In example embodiments, the smart engine 208 may annotate the call transcript with one or more annotations by performing a combination of steps as follows. First, the smart engine 208 may identify the specific points in the call transcript for each of the one or more annotation at which the annotation occurs. To do this, the smart engine 208 may use the output of the annotation model to identify the specific words, phrases, or segments in the call transcript that correspond to the determined annotations. Second, the smart engine 208 may determine the position or range of positions where the annotation occurs in the transcript. This process may involve specifying the start and end indices of the annotated segment. For example, if the annotation is "name", the smart engine 208 may specify the position of the name within the transcript as occurring from character 25 to 32. Third, the smart engine 208 may define a consistent format for representing annotations, which may include information such as the annotation type, its content, and any relevant metadata associated with the annotation. Examples of standardized formats for representing annotations may include JSON, XML, or a custom format as required for a business need for a particular entity. Fourth, the smart engine 208 may integrate the annotations into the call transcript by embedding them directly at the identified positions. This may involve inserting tags, markers, or other indicators to signify the annotated segments. In some embodiments, the smart engine 208 may also associate additional metadata information with the corresponding parts of the transcript. In some embodiments, the smart engine 208 may also implement validation mechanisms to ensure the correct placement of annotations. To do this, the smart engine 208 may cross-reference the annotated segments with the original call transcript and make corrections as needed. For instance, the smart engine 208 may check whether the start and end indices of an annotation falls within the length of the call transcript. If discrepancies are found, the smart engine 208 may adjust the indices to align with the actual positions of the annotations. Further, the smart engine 208 may perform overlap checks of consistency checks to ensure that the annotations do not overlap or conflict with each other and that the annotated segments match the annotations previously determined by the annotation model.

Figure 4C:
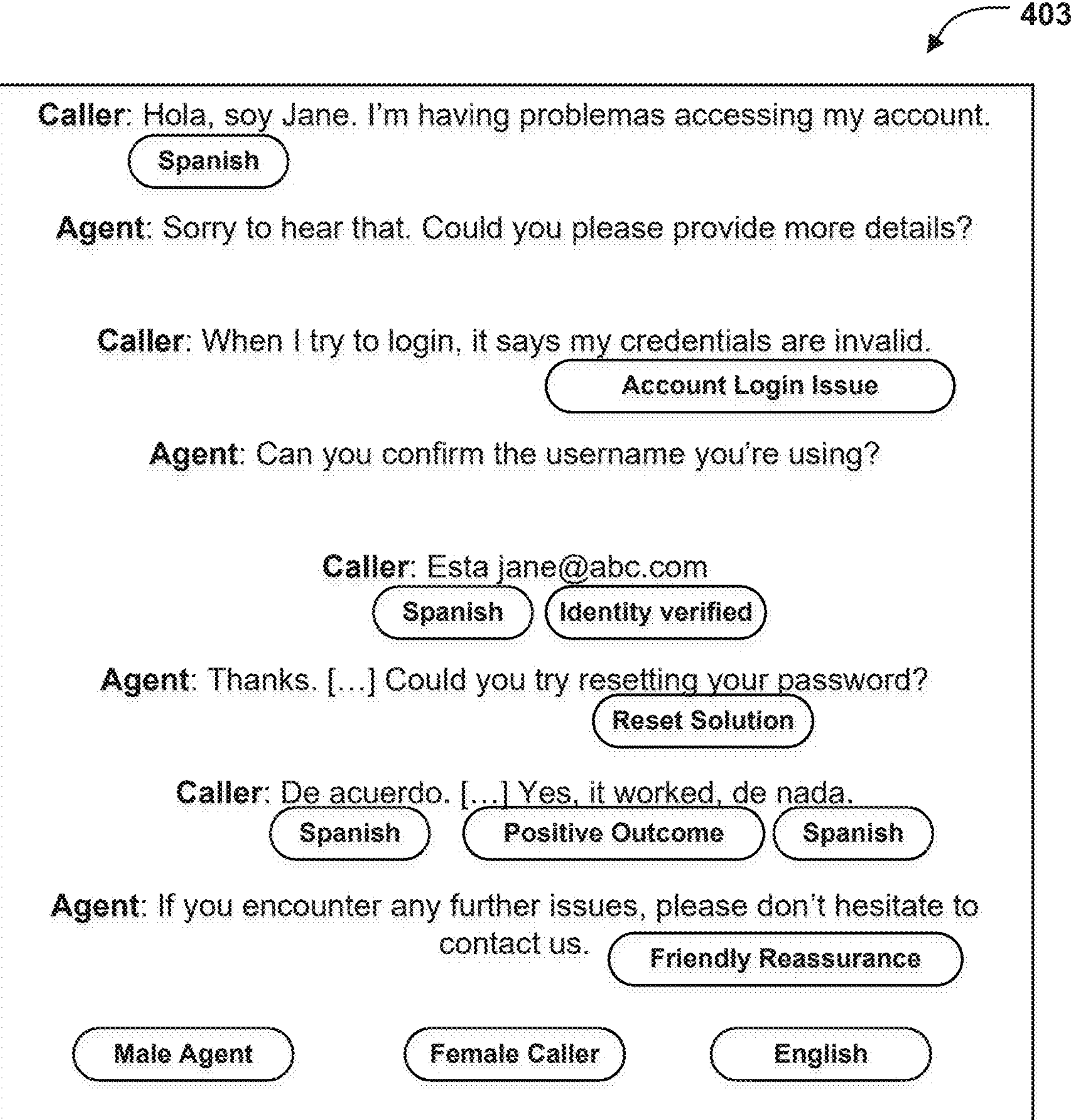
FIG. 4C illustrates an example annotated call transcript summary for the example transcript of FIG. 4A, in accordance with some example embodiments described herein.

An example annotated call transcript is illustrated in FIG. 4C. Turning now to FIG. 4C, the example call transcript of FIG. 4A has been annotated with the one or more determined annotations as included in the annotation summary 402. Here, the smart engine 208 has annotated the call transcript 403 with annotations related to language ("Spanish", "English"), identity verification ("identity verified"), issue type ("account login issue"), resolution ("reset solution", "positive outcome"), and agent behavior ("friendly reassurance"). The smart engine 208 has positioned the determined annotations under the corresponding location of the call transcript. In some embodiments, the smart engine 208 may also choose to annotate the call transcript with metadata as shown at the bottom of the annotated call transcript of FIG. 4C.

Returning to FIG. 3, as shown by operation 310, the apparatus 200 includes means such as smart engine 208, or the like, for determining whether an annotation determined for the call transcript corresponds to a flagged annotation. In some embodiments, the smart engine 208 may perform a flagged analysis to determine whether the one or more annotations correspond to a flagged annotation, each time a call transcript is received. In alternate embodiments, the smart engine 208 may only perform a flagged analysis on a periodic basis as required by the business needs of an entity. To perform the flagged analysis, the smart engine 208 may be provided with predefined flagging criteria or conditions that classify an annotation as a flagged instance. In some embodiments, these conditions may be explicitly defined by a subject matter expert and stored in a library of red flag behaviors which the smart engine 208 may access to determine whether an annotation for the call transcript corresponds to a flagged annotation. In alternate embodiments, the smart engine 208 may rely on rule-based conditions and/or operate in conjunction with the annotation model to identify a flagged annotation. Further, the smart engine 208 may use pattern matching techniques, keyword analysis to compare each determined annotation against the predefined flagging criteria. In some embodiments, the smart engine 208 may implement flagging logic using if-then conditions, linguistic analysis, sentiment analysis, or other natural language processing techniques, to analyze the determined annotation in relation to the flagging criteria. The output of the flagging logic may be compared against a set threshold or a confidence score that is established for filtering out false positives. Establishing a level of confidence required for an annotation to be considered a flagged instance prevents overreliance on potentially inaccurate identifications and resource allocation towards interventions that may not be necessary. The smart engine 208 may further consider the contextual information surrounding an annotation within the call transcript as some flagged behaviors may depend on the broader conversation between the user and the agent. For instance, the smart engine 208 may analyze the statements surrounding a potential flagged annotation to avoid misinterpretation and misidentification of a flagged instance. In an instance in which the smart engine 208 determines that an annotation truly corresponds to a flagged annotation, the procedure may directly proceed to operation 312. However, in instances in which the smart engine 208 determines that an annotation does not correspond to a flagged annotation, the procedure may directly proceed to operation 314.

Consider a scenario in which an agent was using their personal cell phone to conduct official entity business, outside of a recorded line. In this case, if the smart engine 208 captures the communication between the agent and the user on the recorded line, wherein the agent asked the user to call the agent on their personal cell phone, the smart engine 208 may further analyze the generated call transcript and identify the indicators of an agent breaking company policy, triggering an alert to the appropriate entity affiliated personnel and requesting their intervention. As such, the smart engine 208 may perform such risk mitigating functions and target specific terms or phrases to identify the potential of higher risk calls. The mechanism for providing an alert regarding a flagged instance is further described below in connection with operation 312.

As shown by operation 312, the apparatus 200 includes means, such as communications hardware 206, or the like, for providing an alert indicating that the call transcript has been flagged, in an instance in which the annotation corresponds to the flagged annotation. Once the smart engine 208 identifies an annotation that corresponds to a flagged annotation, the smart engine 208 may trigger the communications hardware 206 to initiate an alert mechanism. In some embodiments, the communications hardware 206 may generate an alert containing information about the flagged annotation (e.g., type of annotation, annotation content, timestamp, frequency of occurrence, associated metadata, etc.). The communications hardware 206 may be integrated with a reporting system or a user interface that may display the occurrence of the flagged annotation in the form of a structured report, dashboard, and/or the like. The alert mechanism may assume various forms depending on the integration requirements into the IT infrastructure of the entity. For example, the alert mechanism may be a real-time notification to appropriate entity affiliated personnel (e.g., supervisor(s), quality assurance team(s), compliance officer (s), etc.), or a monitoring system responsible for overseeing all calls. In some embodiments, the alert mechanism may not be a real-time notification, and instead, may only be logged into a monitoring system for review or evaluation at a later time. Further, in some embodiments, the communications hardware 206 may trigger actions in external systems, such as customer relationship management (CRM) platforms or ticketing systems. It is important to note that regardless of the type of alert mechanism used, the communications hardware 206 must be integrated with the alert mechanism in some form (e.g., via physical hardware or via a remote connection).

In some embodiments, once the alert has been provided to the appropriate destination, the communications hardware 206 may provide a platform for responding to the flagged annotation. This may include reviewing the flagged segment of the call transcript, investigating the context, and taking appropriate actions, such as providing additional training to the agent, initiating further customer support, or escalating the issue to an individual in a higher position of authority. In some embodiments, the communications hardware 206 may provide a reviewer with prompts to assist them in determining the nature and severity of the flagged annotation. For example, the communications hardware 206 may output one or more prompts asking the reviewer the following questions: (i) "please provide additional context or details regarding the flagged annotation to help understand the situation better", (ii) "on a scale of 1 to 5, with 1 being minor and 5 being critical, please assess the severity of the flagged annotation in terms of impact on customer satisfaction, (iii) "based on your review of the flagged annotation, do you have any recommendations for corrective actions or improvements, if necessary", (iv) "please provide feedback or suggestions for coaching that could help the agent address the flagged behavior in future interactions", (v) "how do you perceive the flagged behavior might impact the customer experience, and what steps could be taken to mitigate any negative impact", (vi) "perform a root cause analysis to understand the underlying factors contributing to the flagged behavior", and/or the like. The communications hardware 206 may receive a response for each of the one or more prompt from the reviewer and may store the response in the history recorder repository 106 with the annotated call transcript.

In some embodiments, operation 308 may directly proceed to operation 314. As shown by operation 314, the apparatus 200 includes means such as smart engine 208, or the like, for storing the annotated call transcript in a history recorder repository 106. The smart engine 208 may store the annotated call transcript in a history recorder repository 106 that may be hosted remotely or by an entity device 112A-112N. The format in which the annotated call transcript is stored may be predetermined by the targeted analytics report generation system 102. Example storage formats include JavaScript object notation (JSON), extensible markup language (XML), or database formats. In some embodiments, the smart engine 208 may store the annotated call transcript taking into consideration the complexity and structure of the annotations. In some embodiments, the smart engine 208 may store annotated call transcripts with a flagged annotation in a separate sub-folder of the history recorder repository 106.

In some embodiments, the smart engine 208 may store the annotated call transcript in history recorder repository 106 using an indexing method for efficient retrieval. This may involve using unique identifiers or indexing based on metadata fields to speed up search operations. For example, in a relational database, the smart engine 208 may create indexes on fields such as call ID, timestamp, or other metadata. Further, the smart engine 208 may integrate a search engine with the history recorder repository 106 to create a searchable index of call transcripts. This type of indexing system may particularly be useful for large-scale repositories of annotated call transcripts. In some embodiments, the smart engine 208 may implement versioning mechanisms (e.g., Git) if updates or revisions to the annotated call transcripts are anticipated. This ensures a historical record of changes made to the annotated call transcripts. Further, the smart engine 208 may include timestamps in the metadata of each annotation, indicating when the annotation was made, which may allow for tracking changes over time.

In some embodiments, the smart engine 208 may encrypt the annotated call transcripts before storing them in history recorder repository 106. In particular, the smart engine 208 may use encryption algorithms such as advanced encryption standard (AES) to protect sensitive user information. In addition, the smart engine 208 may implement robust key management practices to safeguard encryption keys and ensure that only authorized entities may decrypt and access the stored annotated call transcript. To do this, the smart engine 208 may (i) use cryptographically secure random number generators to generate encryption keys, (ii) store encryption keys in secure, dedicated key storage systems, (iii) implement regular key rotation, changing encryption keys at predefined intervals, (iv) use secure channels or key management protocols for distributing encryption keys, (v) establish procedures for revoking compromised or compromised-access keys, (vi) implement multi-factors authentication for accessing key management systems, (vii) define a comprehensive key lifecycle management policy, including creation, usage, rotation, and destruction, (viii) implement role-based access control to assign specific roles and permissions for key management, (ix) regularly backup encryption keys and securely store backup copies, (x) implement continuous monitoring of key management systems and maintain detailed audit logs, (xi) conduct periodic security audits on key management processes and systems, (xiii) develop secure procedures for the destruction of keys that are no longer needed, and/or the like. By incorporating these key management practices, the smart engine 208 may help entities establish a secure foundation for handling encryption keys, protecting the sensitive data associated with annotated call transcripts. In addition, the smart engine 208 may implement audit trails to log access activities and monitor who access the history recorder repository 106, when it was accessed, and what actions were performed.

Figure 5:
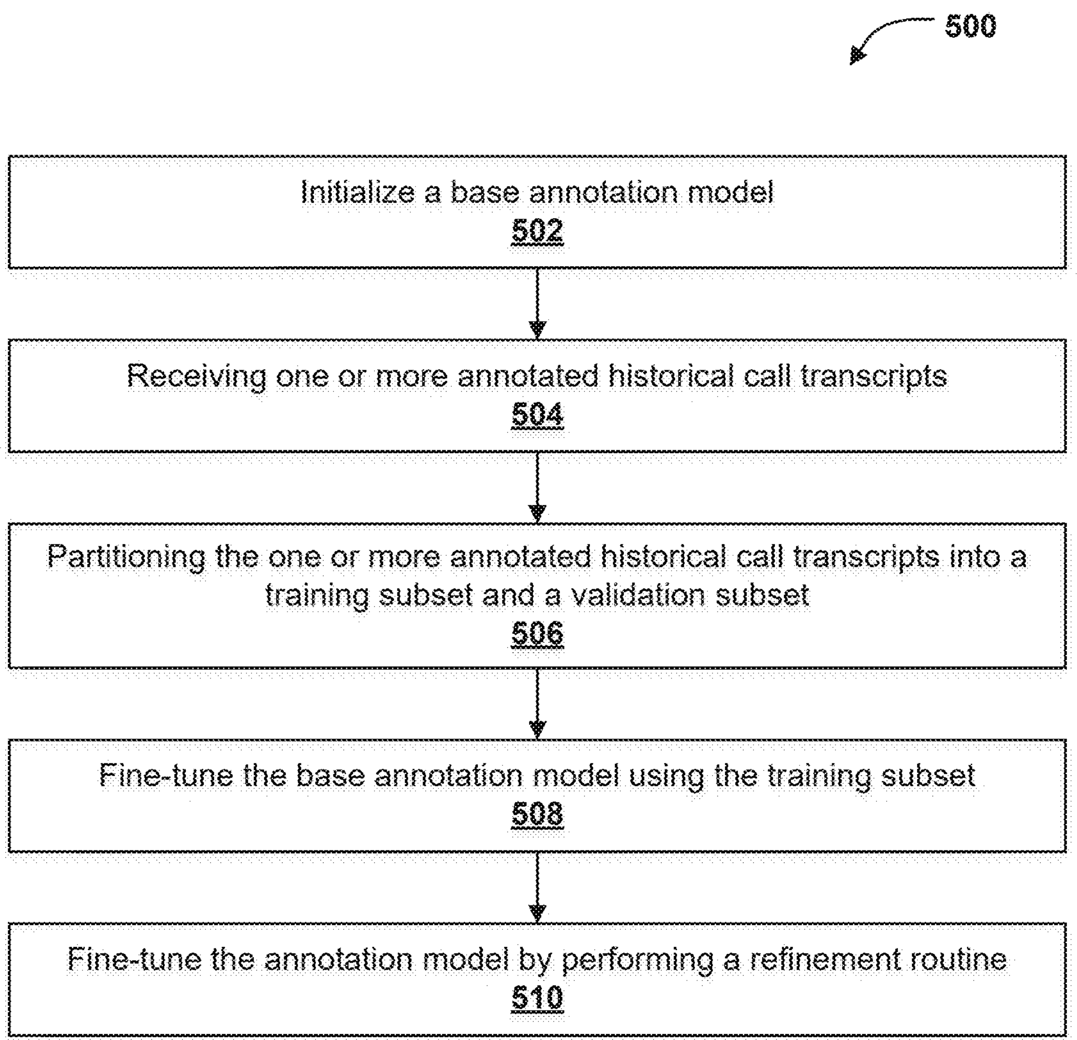
FIG. 5 illustrates an example flowchart for training and/or fine-tuning the annotation model using a training routine, in accordance with some example embodiments described herein.

In some embodiments, operation 304 may be preceded by operation 302. As shown by operation 302, the apparatus 200 includes means such as training engine 212, or the like, for training/fine-tuning an annotation model using a training routine. Operation 302 may be performed in accordance with the operations described in FIG. 5. Turning now to FIG. 5, a procedure 500 illustrates example operations for training/fine-tuning an annotation model using a training routine.

As shown by operation 502, the apparatus 200 includes means, such as training engine 212, or the like, for initializing a base annotation model. A base annotation model refers to a pre-trained language learning model (e.g., GPT-4, GPT-3, BERT, and/or the like). Initializing the base annotation model involves setting up the initial state of the model before training or fine-tuning. The training engine may initialize the base annotation model using one or more of the following steps, and/or the like. These steps may occur in the stated sequence as follows, or any other sequence deemed appropriate by the entity. First, the training engine 212 may select a pre-trained model (i.e., base annotation model) that can serve as the base for annotation tasks. The selected base annotation model may already have learned patterns and features from a vast dataset. Second, the pre-trained weights of the selected base annotation model may be loaded into the training engine 212. These weights represent the learned parameters of the selected base annotation model and capture the patterns and information of the data it was originally trained on. In some embodiments, the training engine 212 may modify the architecture of the base annotation model to suit the specific requirements of the annotation task. In some embodiments, this may involve adjusting layers, adding new layers, or fine-tuning certain components. In alternate embodiments, the training engine 212 may freeze certain layers of the base annotation model to prevent them from being updated during the initial training. This would be particularly beneficial in a transfer learning environment wherein lower layers capture general features that are useful for various annotation tasks. Further, the training engine 212 may initialize or randomly set the weights of annotation task-specific layers that will be fine-tuned for the annotation task, which may be added on top of the base annotation model to adapt it to the specific nuances of the annotation task. The training engine 212 may also determine initialization strategies for specific layers of the base annotation model based on the nature of the annotation task. For example, the training engine 212 may use Xavier/Glorot initialization for fully connected layers or He initialization for ReLU activation layers. In addition, the training engine 212 may define learning rates for different layers. A higher learning rate may be used for task-specific layers, allowing them to adapt more quickly, whereas lower learning rates may be used for pre-trained layers to preserve their learned features. In instances where the annotation task involves embedding annotations, the training engine 212 may initialize them based on pre-trained word embeddings or other relevant representations. In some embodiments, where domain-specific knowledge is available, the training engine 212 may incorporate this into the initialization process. This may involve initializing certain weights based on domain-specific embeddings or features. The training engine 212 may also choose and initialize an optimizer and loss function based on the specifics of the annotation task. Common choices may include Adam or SGD for optimizers and categorical cross-entropy or mean squared error for loss functions.

As shown by operation 504, the apparatus 200 includes means, such as training engine 212, or the like, for receiving one or more annotated historical call transcripts. The training engine 212 may establish a connection with the history recorder repository 106 through an application programming interface (API) to extract the annotated historical call transcripts. In some embodiments, the training engine 212 may directly query the history recorder repository 106 if the history recorder repository 106 is database-driven. The training engine 212 may formulate queries to retrieve a subset or all the annotated historical call transcripts stored in the history recorder repository. These queries may be based on criteria such as timestamps, call IDs, or relevant data, and may be designed to target the data needed for training the base annotation model. If the history recorder repository 106 contains a large volume of transcripts, the training engine 212 may implement pagination or batching strategies to help manage the retrieval process efficiently, preventing resource overload. The training engine 212 may then choose an appropriate data transfer protocol for transmitting the annotated historical call transcripts from the history recorder repository 106 to the training engine 212 over the communications network 108. Other common protocols may include HTTP/HTTPS for APIs or SQL for database queries. In some embodiments, the training engine 212 may perform any necessary data transformation to align the annotated historical call transcripts with the input format expected by the base annotation model. The training engine 212 may further be equipped with error-handling mechanisms to manage situations where the retrieval process encounters issues. In such cases, the training engine 212 may enable logging to capture relevant information for troubleshooting and monitoring purposes. Upon receiving the annotated historical call transcripts, the training engine 212 may perform an assessment to ensure the consistency and integrity of the retrieved annotated historical call transcripts. This may involve verifying timestamps, metadata, and the presence of required annotation information. In some embodiments, the training engine 212 may store the retrieved data temporarily in a buffer or cache before initiating the training process. This step may enhance efficiency by avoiding redundant data retrieval.

As shown by operation 506, the apparatus 200 includes means, such as training engine 212, or the like, for partitioning the one or more received annotated historical call transcripts into a training subset and a validation subset. A training subset refers to a portion of the annotated historical call transcripts that are used for training the base annotation model. The data within this training subset may be employed by the base annotation model during the training phase to learn patterns, relationships, and features that enable it to make predictions or classifications. The training subset may be used to optimize the parameters of the base annotation model and adjust its weights based on the provided annotated historical call transcripts. In other words, the training subset represents the labeled data used to teach the model the underlying patterns of the annotation task. Conversely, a validation subset is the distinct portion of the retrieved annotated historical call transcripts that are set aside to assess the performance of the base annotation model during training. The data in the validation subset is not used in the training process and serves as an independent dataset for evaluating how well the base annotation model generalizes to new, unseen examples. The performance of the base annotation model on the validation subset may help identify issues like overfitting, underfitting, and may help fine-tune hyperparameters. The validation subset may play a crucial role in determining how well the trained model might perform on new, unseen data once deployed in a real-world scenario.

The training engine 212 may partition the annotated historical call transcripts into a training subset and validation subset using a partitioning method. Example partitioning methods include: (i) random sampling, (ii) stratified sampling that maintains the distribution of specific classes in both the training and validation subset, (iii) percentage split (e.g., 70% of the annotated historical call transcripts may be used for training, whereas 30% of the annotated historical call transcripts may be used for validation), (iv) time-stamp based split to ensure that the training set includes earlier historical annotated call transcripts, while the validation subset represents more recent instances, (v) metadata-based split to ensure diversity in both subsets, (vi) shuffling the sampled portion of the annotated historical call transcript to ensure randomness and avoid bias, and/or the like. Once the annotated historical call transcripts are partitioned, the training engine 212 may verify whether the distribution of the classes or categories is consistent between the training and validation subsets. In some embodiments, the training engine 212 may store the training and validation subsets temporarily in designated data structures or files. This may be useful for subsequent training iterations or if adjustments need to be made to either or both of the training subset and validation subset. The training engine 212 may further convert the annotated call transcripts into a suitable format for training, such as numerical representations or embeddings, ensuring compatibility with the base annotation model.

As shown by operation 508, the apparatus 200 includes means, such as training engine 212, or the like, for fine-tuning the base annotation model using the training subset, wherein the training subset comprises (a) annotated historical call transcripts, (b) each annotated call transcript is annotated with one or more ground-truth annotations, and (c) each ground-truth annotation corresponds to one or more attributes of interest. A ground-truth annotation refers to an annotation that has been manually labeled and/or verified by a subject matter expert. A ground-truth annotation serves as a reference against which the performance of a machine learning model is evaluated. Ground-truth annotations represent accurate and reliable labels for the attributes of interest within the annotated historical call transcripts. An attribute of interest refers to the specific aspect, feature, or characteristic within the annotated historical call transcript that is associated with a ground-truth annotation. Examples of attributes of interest include, (i) sentiment—the emotional tone expressed in the call, indicating whether the speaker's sentiment is positive, negative, or neutral, (ii) topic—the main subject or topic discussed in the call transcript, (iii) intent—the purpose or goal behind the speaker's communication, (iv) customer satisfaction level—an indication of how satisfied or dissatisfied the customer is based on their expressed opinions, (iv) issue resolution status—whether the issue raised by the customer has been resolved or remains open, (v) product or service mentioned—identification of specific products or services mentioned in the call, (vi) agent behavior, (vii) caller identity verification, (viii) language spoken, and/or the like.

The training engine 212 may fine-tune the base annotation model using the training subset by converting the annotated historical call transcripts and associated ground truth annotations into a suitable format for training. This may involve transforming textual data into numerical representations or embeddings that the base annotation model can process. The training engine 212 may then train the base annotation model using the annotated historical call transcripts in the training subset, wherein the ground truth annotations serve as the target labels during training, guiding the base annotation model to learn patterns and features relevant to the attributes of interest. The training engine 212 may iteratively adjust parameters of the base annotation model through backpropagation and optimization algorithms, with the goal of minimizing the dissimilarity between model generated annotations and ground-truth annotations. In support of this, the training engine 212 may choose a suitable loss function that is pivotal in quantifying this dissimilarity and guiding the learning process. As the base annotation model learns to generalize its understanding from the training subset to make predictions on unseen data, this iterative process may involve iteratively improving the quality of the learned representations through multiple training epochs, capturing nuanced patterns, and refining the ability of the base annotation model to predict the annotations in the annotated historical call transcripts.

Figure 6:
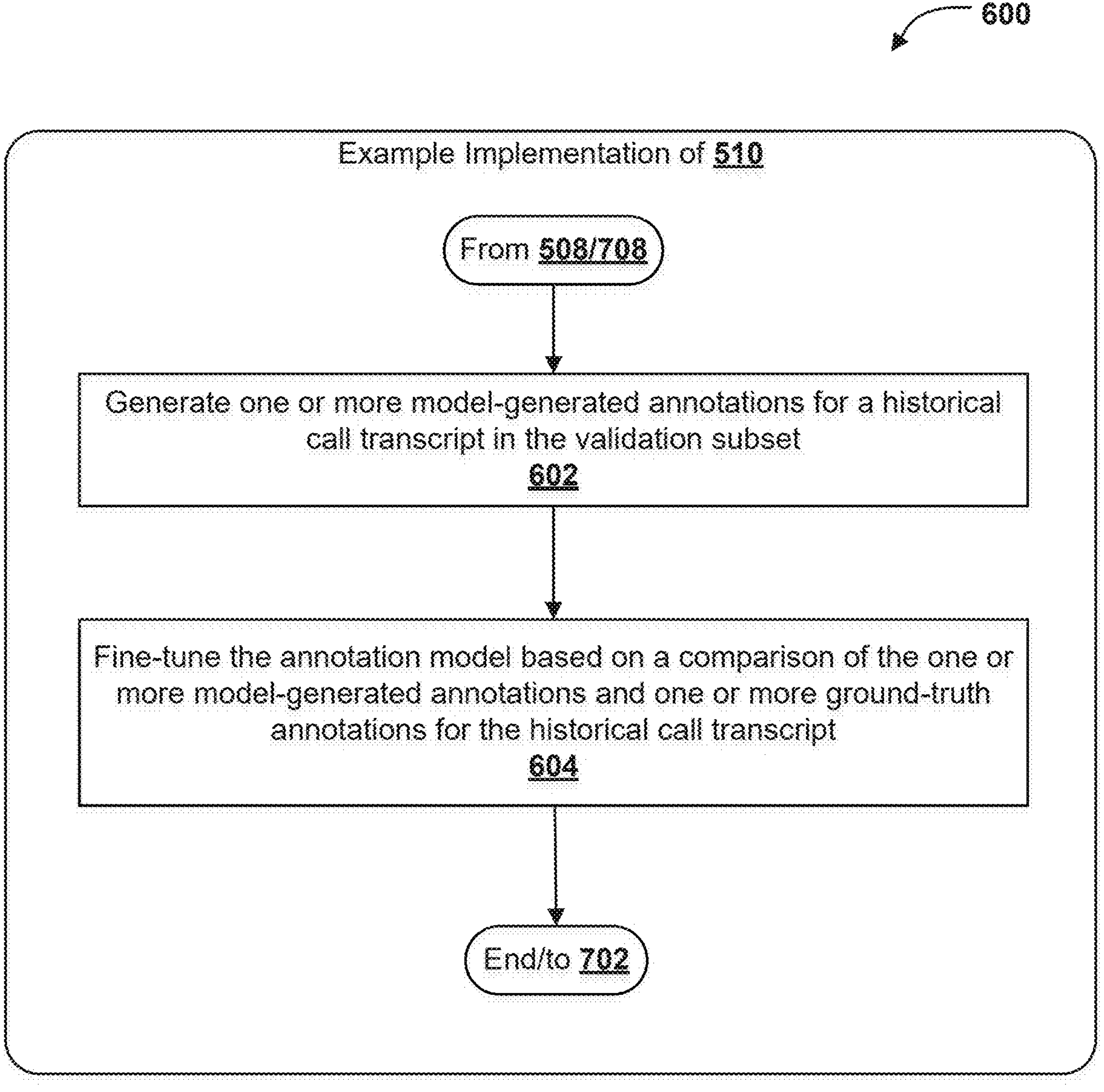
FIG. 6 illustrates an example flowchart for fine-tuning the annotation model by performing a refinement routine, in accordance with some example embodiments described herein.

Finally, as shown by operation 510, the apparatus 200 includes means, such as training engine 212, or the like, for fine-tuning the annotation model by performing a refinement routine. In some embodiments, operation 510 may be performed in accordance with the operations described in FIG. 6. Turning now to FIG. 6, a procedure 600 illustrates example operations for fine-tuning the annotation model by performing a refinement routine.

As shown by operation 602, the apparatus 200 includes means, such as training engine 212, or the like, for generating, using the annotation model, one or more model-generated annotations for a historical call transcript in the validation subset. The training engine 212 may begin operation 602 by preprocessing the text of the historical call transcript from the validation subset and converting the text into a format compatible with the annotation model, such as numerical representations or embeddings. The training engine 212 may feed the preprocessed historical call transcript to the annotation model by passing the text through the various layers of the annotation model, wherein the annotation model may leverage its learned parameters to extract relevant features. The annotation model may then perform an inference to generate the annotations for a given historical call transcript in the validation subset. To do this, the annotation model, in conjunction with the training engine 212, may employ various techniques, such as: (i) forward propagation—passing the preprocessed historical call transcript through layers of the neural network, wherein each layer performs computations using the learned weights and biases to generate an annotation, (ii) activation function—helps the annotation model capture complex patterns, relationships, and non-linearities for a given historical call transcript, (iii) softmax activation—converts the raw output scores into probabilities, indicating the likelihood of each annotation type being present in a given historical call transcript, (iv) thresholding—setting a threshold to determine whether an annotation type is present in a given historical call transcript, (v) tokenization and embedding lookup—tokenizing the historical call transcript into individual words using embedding layers to look up pre-trained word embeddings that represent words or tokens as numerical vectors, and/or the like. In some embodiments, techniques such as contextual embeddings (i.e., considering the context of each word based on surrounding words), attention mechanisms (i.e., focusing the model's attention on specific parts of the input), post-processing (i.e., threshold adjustments, filtering out low-confidence predictions, or incorporating additional logic to refine the model's output), handling imbalanced data (i.e., adjusting class weights during inference to ensure the model performs well across different class distributions), and/or the like may also be used during generation of the annotations. In some embodiments, the training engine 212 may generate one or more annotations for the historical call transcript using one or more of the aforementioned steps of operation 306 in combination with the aforementioned steps of operation 602.

Consider the following scenario in which the training engine 212 may feed a historical call transcript to the annotation model, with the goal of performing a sentiment analysis on the historical call transcript. The historical call transcript may be passed through the layers of the annotation model, until it reaches the output layer of the annotation model, at which point a softmax activation function may be applied to the historical call transcript that outputs scores of [0.8, 0.15, 0.05]. These scores indicate a high likelihood of positive sentiment (0.8), a lower likelihood of negative sentiment (0.15), and an even lower likelihood of neutral sentiment (0.05). A threshold may then be applied to determine the final predicted sentiment class. If the model-generated score surpasses a certain threshold (e.g., 0.5 for a positive sentiment), the annotation model may generate an annotation of "positive sentiment" for the inputted call transcript. In some embodiments, where the scores are very close (e.g., [00.4, 0.35, 0.25]), the model may generate an annotation labeled as "uncertain", or "neutral" to account for ambiguity.

Finally, as shown by operation 604, the apparatus 200 includes means, such as training engine 212, or the like, for fine-tuning the annotation model based on a comparison of the one or more model-generated annotations and one or more ground-truth annotations from the historical call transcript in the validation subset. Upon obtaining the model-generated annotations for a given historical call transcript, the training engine 212 may retrieve the corresponding ground-truth annotations for the historical call transcript from the history recorder repository 106. The training engine 212 may employ one or more comparison techniques to compare the one or more model-generated annotations against the one or more ground-truth annotations. In some embodiments, the training engine 212 may use a loss function (e.g., cross-entropy loss) to quantify the dissimilarity between the model-generated annotations and the ground truth annotations. The loss value may then be used by the training engine 212 for backpropagation through the neural network. Backpropagation calculates the gradients of the loss with respect to the parameters of the annotation model. These gradients may guide an optimization algorithm in adjusting the weights and biases of the annotation model to minimize the loss. An optimization algorithm, such as gradient descent, and/or the like, may be utilized to update the parameters of the annotation model based on the calculated gradients. This iterative process may refine the ability of the annotation model to generate annotations that align closely with the ground-truth annotations. In some embodiments, the training engine 212 may use comparison metrics such as precision, recall, F1 score, or accuracy for a detailed evaluation of the annotation model's performance. Precision refers to the ratio of true positive predictions to the sum of true positives and false positives. In other words, precision measures the accuracy of positive predictions made by the annotation model, indicating how many of the predicted positive instances are actually true positives. The recall comparison metric may be calculated as the ratio of true positive predictions to the sum of true positives and false negatives that measures the ability of the annotation model to capture all actual positive instances. The F1 score refers to the harmonic mean of precision and recall, providing a balanced measure of the annotation model's performance, which may especially be useful in scenarios with imbalanced class distributions. The accuracy comparison metric refers to the overall correctness of the model-generated annotations and is calculated as the ratio of correctly predicted instances to the total number of instances. Depending on the comparison metric used, the training engine 212 may classify a model-generated annotation as being a true positive, false positive, false negative, or a true negative. These comparison metrics may collectively offer insights into the strengths and weaknesses of the annotation model, guiding the refinement routine to improve the overall performance of the annotation model.

Figure 7:
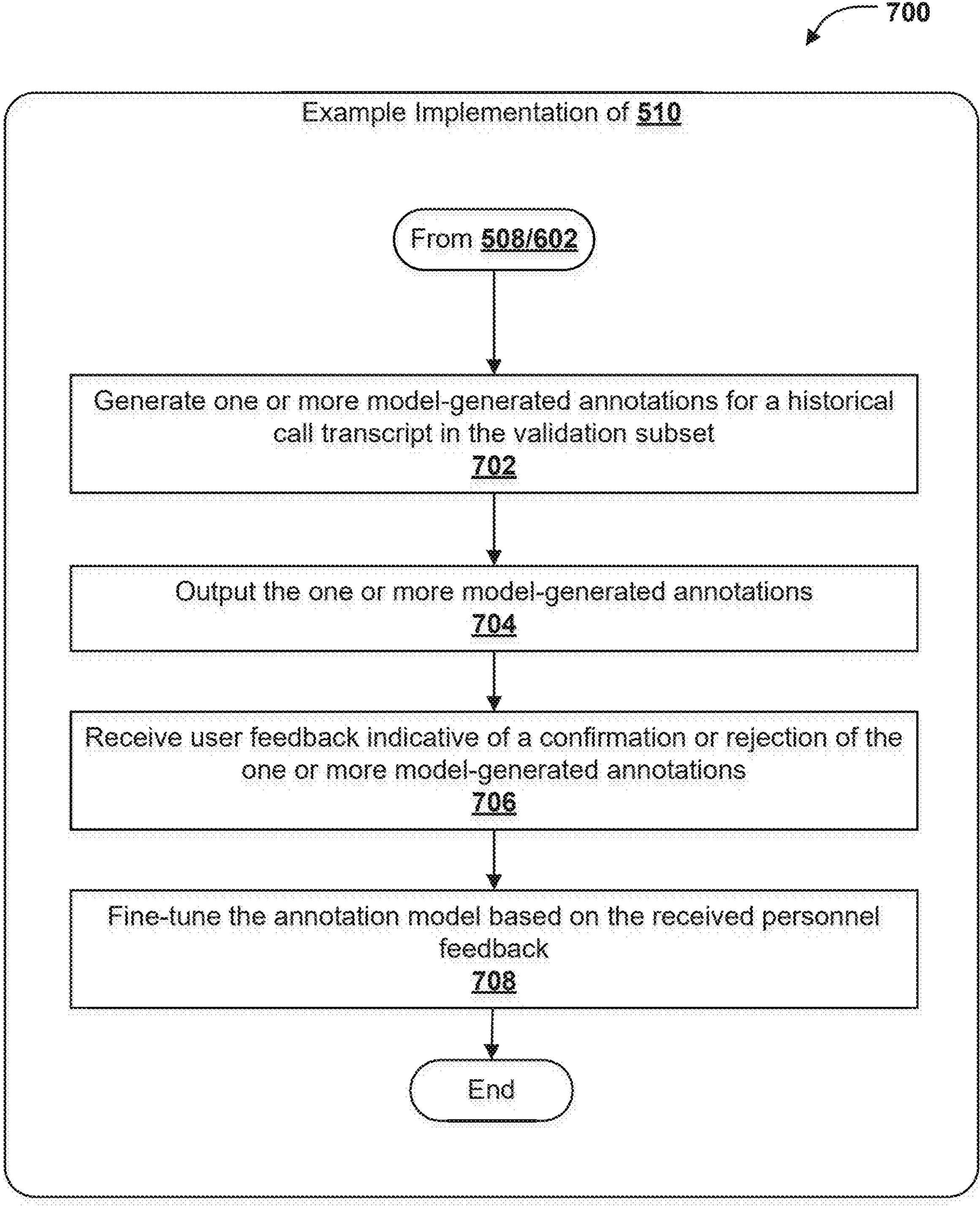
FIG. 7 illustrates an example flowchart for fine-tuning the annotation model by performing a feedback routine, in accordance with some example embodiments described herein.

In some embodiments, operation 510 may be performed in accordance with the operations described in FIG. 7. Turning now to FIG. 7, a procedure 700 illustrates example operations for fine-tuning the annotation model by performing a feedback routine.

As shown by operation 702, the apparatus 200 includes means, such as training engine 212, or the like, for generating one or more model-generated annotations for a historical call transcript in the validation subset. Operation 702 may occur as discussed above in operation 602.

As shown by operation 704, the apparatus 200 includes means, such as communications hardware 206, or the like, for outputting the one or more model-generated annotations for the historical call transcript. The communications hardware 206 may be integrated with an entity interface, which may be a web-based dashboard, a desktop application, or a specialized software platform. The entity interface may serve as the medium through which entity affiliated personnel may interact with the targeted analytics report generation system 102. The annotation model may expose an application programming interface (API) or be integrated into the communications hardware 206. Here, the API may facilitate communication between the annotation model and the entity interface. The communications hardware 206 may output the model-generated annotations to the entity interface through the API. The communications hardware 206 may format the model-generated annotations in a user-friendly manner, which may involve converting numerical outputs into human readable labels, organizing the annotations and aligning them with the presented call transcript, and/or the like. In some embodiments, the communications hardware 206 may select a format for presenting the annotations in a manner which is the most suitable for the entity type (e.g., a business versus a hospital). In addition, depending on the business needs of the entity, the communications hardware 206 may support real-time processing, providing annotations as soon as they are generated by the annotation model. In alternate embodiments, the communications hardware 206 may support batch processing for multiple historical call transcripts and output the annotations on a periodic basis instead. Regardless of when the model-generated annotations are outputted, the communications hardware 206 may output the annotations to an interactive entity interface through which entity affiliated personnel may interact with the outputted annotations, review them, and use the outputted information for decision-making, analysis, or other actions in the context of their workflow.

As shown by operation 706, the apparatus 200 includes means, such as communications hardware 206, or the like, for receiving feedback from entity affiliated personnel comprising a confirmation or a rejection of the one or more model-generated annotations. The communications hardware 206 may have a pre-established interactive loop between the communications hardware 206 and the entity interface. In particular, the communications hardware 206 may integrate functionalities that allow entity affiliated personnel to provide feedback on the model-generated annotations. These functionalities may be implemented through buttons, checkboxes, or other interactive elements within the entity interface. In some embodiments, the communications hardware 206 may present the model-generated annotations in the context of the historical call transcript. In other words, the historical call transcript may be overlayed with the model-generated annotations based on the particular conversation features of the historical call transcript. The entity interface may allow entity affiliated personnel to provide feedback on each model-generated annotation. Common options may include a confirmation button, a rejection button, an unsurety button, an/or the like. These options may represent the entity affiliated personnel's judgement on the accuracy of the model-generated annotations. Upon receiving feedback from the entity affiliated personnel, the communications hardware 206 may trigger model refinement and/or retraining in an instance in which the feedback indicates that the model-generated annotation is incorrect. In some embodiments, the communications hardware 206 may log feedback from the entity affiliated personnel for analytic purposes. This data may be valuable for assessing the performance of the annotation model, identifying patterns in feedback of the entity affiliated personnel, and/or the like. In some embodiments, the communications hardware 206 may still trigger model refinement and/or retraining in an instance in which the feedback indicates that the model-generated annotation is correct. In an instance in which the received feedback indicates the model-generated annotation as being incorrect, the annotation model may generate a revised and/or alternative annotation and subsequently output it to the entity interface via communications hardware 206. Similar to the model-generated annotation process, the communications hardware 206 may support real-time or batch processing of feedback from entity affiliated personnel. Real-time processing may enable immediate adjustments and refinement to the annotation model, whereas batch processing may occur periodically depending on the business needs of the entity. In some embodiments, the communications hardware 206 may include notification mechanisms to alert entity affiliated personnel when their feedback has been successfully received and processed by the annotation model. These notifications may be delivered through the entity interface and/or other communication channels (e.g., email notifications, phone notifications).

Finally, as shown by operation 708, the apparatus 200 includes means, such as training engine 212, or the like, for fine-tuning the annotation model based on the feedback of the entity affiliated personnel. The received personnel feedback may be preprocessed to extract relevant information. This may involve organizing the feedback based on timestamps, associating it with specific historical call transcripts, categorizing the feedback into confirmation or rejection categories, and/or the like. The training engine 212 may further align the feedback data with the corresponding model-generated annotations so that the training engine 212 may understand which specific annotations received confirmation or rejection from entity affiliated personnel. The training engine 212 may then utilize the aligned feedback data to adjust the parameters of the annotation model. This adjustment process may involve updating the weights and biases of the annotation model based on the feedback data.

Techniques such as gradient descent may be used for this purpose. In some embodiments, the learning rate of the annotation model may be adjusted based on the feedback data. After adjusting the parameters of the annotation model, the training engine 212 may monitor the performance of the annotation model on a separate validation subset. This subset may include historical call transcripts that were not part of the training subset or the previously used validation subset. By doing this, the training engine 212 ensures that adjustments based on feedback of entity affiliated personnel improves the generalization of the annotation model. This fine-tuning process may be iterative. In other words, the training engine 212 may repeat the adjustment, validation, and monitoring steps across multiple cycles, and may implement versioning to keep track of the different iterations of the annotation model. This may allow for easy rollback to a previous version if necessary and may help with maintaining a history of improvements. Overall, the training engine 212 may continuously monitor user feedback, adjust the model, and update its parameters as needed. This ongoing process may ensure that the annotation model remains responsive to evolving user needs and data patterns. In addition, the training engine 212 communicates the updated model or model parameters back to the communications hardware 206, ensuring that the deployed annotation model reflects the latest improvements.

Figure 8:
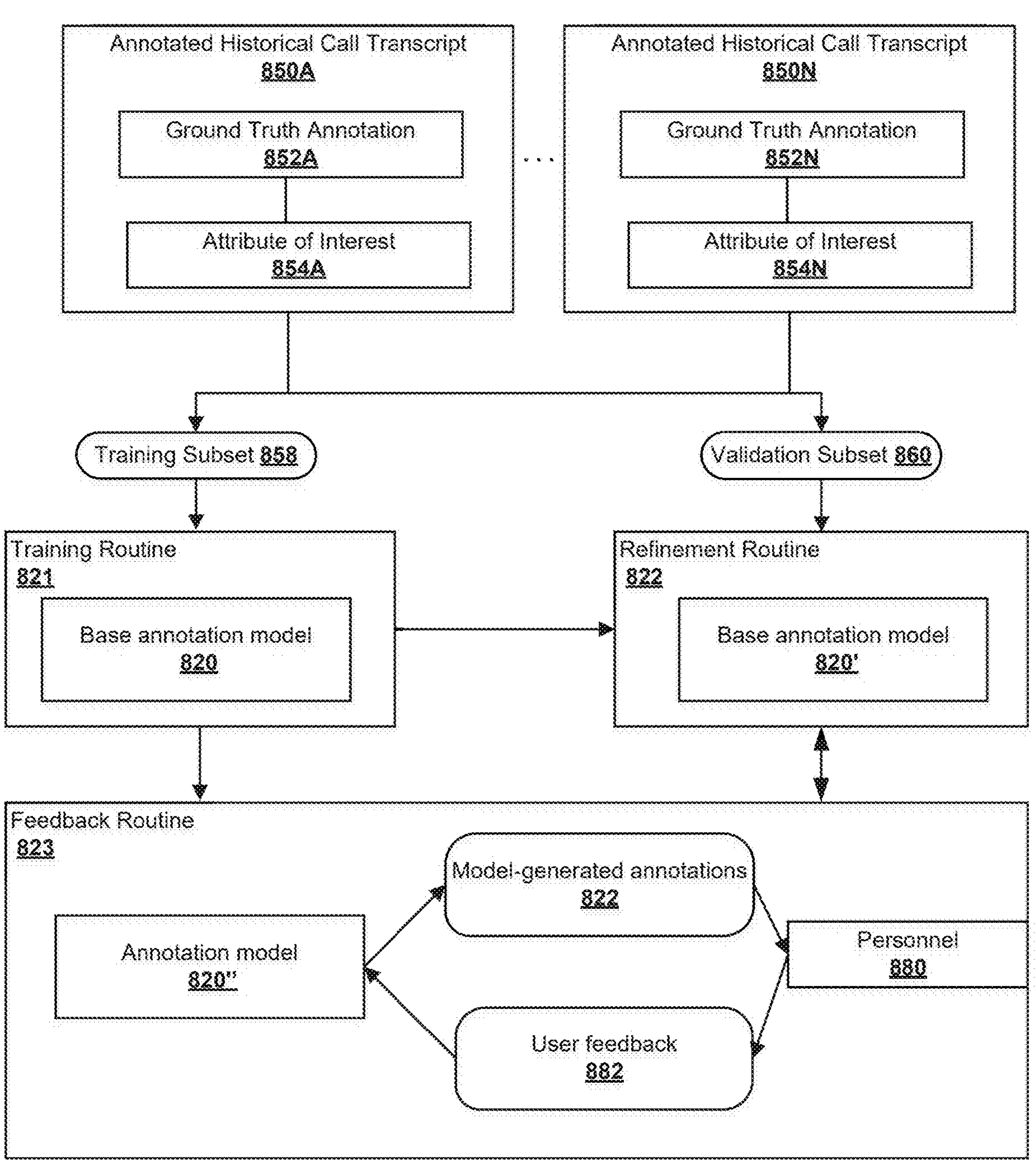
FIG. 8 illustrates a schematic block diagram of the training processes that may be used to train and/or fine tune the annotation model, in accordance with some example embodiments described herein.

The operations of FIGS. 5-7 are further summarized by a schematic block diagram in FIG. 8. An annotated historical call transcript 850A-850N may be associated with a ground-truth annotation 852A-852N, wherein the ground truth annotation 852A-852N may correspond to a particular attribute of interest 854A-854N. The annotated historical call transcript may be partitioned into a training subset 858 and a validation subset 860. The training subset 858 may undergo a training routine 821 to create a trained base annotation model 820, which may then undergo a refinement routine 822 to create the refined base annotation model 830. In some embodiments, the base annotation model 820 may undergo refining via a feedback routine 823, creating an annotation model 840 The annotation model 840 may generate model-generated annotations 878, output them to personnel 880 (e.g., entity-affiliated personnel), receive user feedback 882 regarding the model-generated annotations, and use the user feedback 882 to iteratively refine the annotation model 840. In some embodiments, the refined base annotation model 830 may undergo the feedback routine 823 after undergoing the refinement routine 822. An annotation model may be iteratively refined through a loop of the refinement routine 822 to the feedback routine 823, again to the refinement routine 822, and so on.

Example Operations for Providing a Targeted Analytics Report

Figure 9:
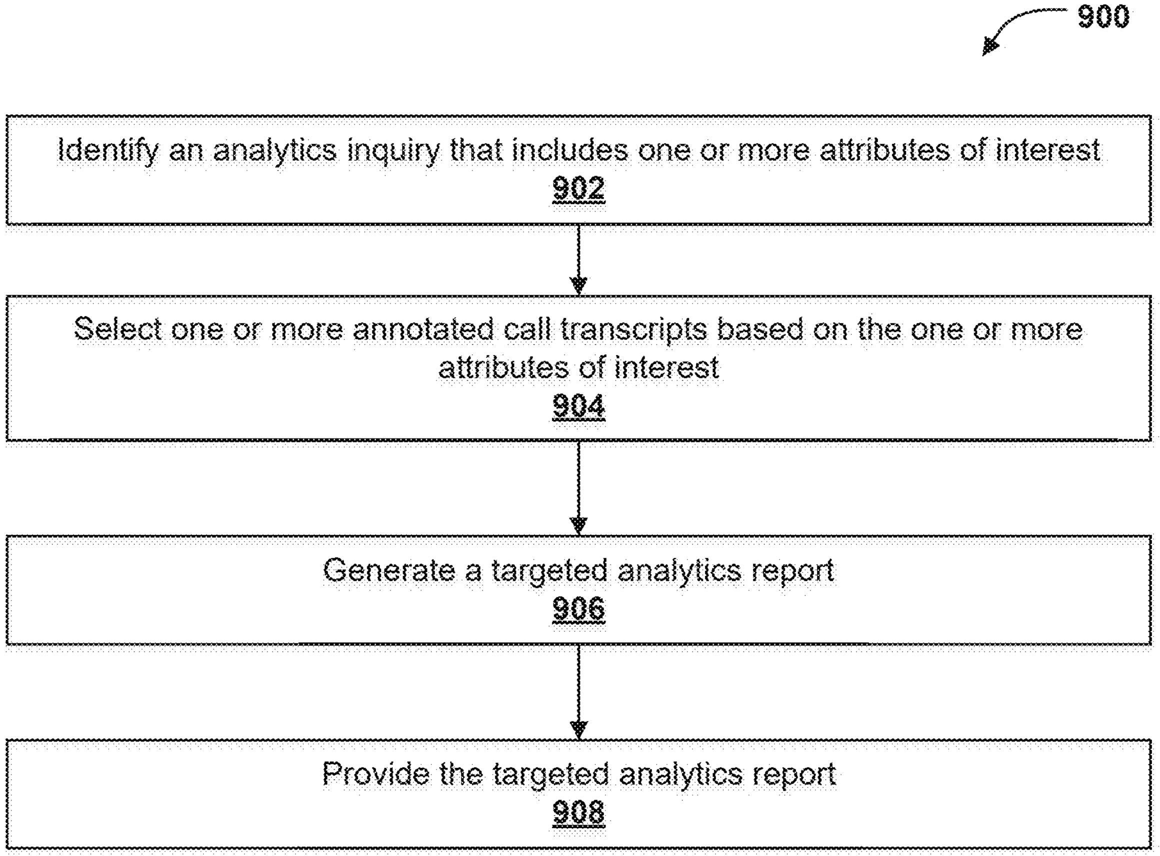
FIG. 9 illustrates an example flowchart for generating a targeted analytics report, in accordance with some example embodiments described herein.

Turning now to FIG. 9, a procedure 900 illustrates example operations for providing the targeted analytics report. The apparatus 200 includes means, such as processor 202, memory 204, communications hardware 206, analytics engine 210, or the like for providing a targeted analytics report. A targeted analytics report refers to a report that provides details insights and analysis on a particular aspect or set of metrics based on analysis of a call transcript. This type of report is designed to address specific questions, objectives, attributes of interest, offering a concise and tailored overview of relevant data and findings. The goal of a targeted analytics report is to provide actionable and valuable information to support decision-making or strategic initiatives within a specific domain or business functions. This report may include metrics related to key performance indicators (KPIs), trends, patterns, and recommendations related to the defined scope of analysis.

As shown by operation 902, the apparatus 200 includes means, such as analytics engine 210, or the like, for identifying an analytics inquiry, wherein the analytics inquiry comprises one or more attributes of interest, wherein an attribute of interest corresponds to one or more annotations. The analytics engine 210 may begin operation 902 by parsing an incoming analytics inquiry by breaking down the text or input into its constituent parts, such as words, phrases, and syntactic structures. In some embodiments, the analytics engine 210 may tokenize the parsed query so that the individual words or tokens are identified. This step may help the analytics engine 210 understand the semantic structure of the analytics inquiry. Each token may be tagged with a part of speech (e.g., noun, verb, adjective) to understand the grammatical structure and thus the context of the analytics inquiry. In some embodiments, named entity recognition may be employed to identify specific terms or phrases within the analytics inquiry that are related to one or more attributes of interest, that correspond to one or more annotations. The analytics engine 210 may employ a pattern matching algorithm to identify known patterns associated with predefined attributes of interest by comparing the parsed analytics inquiry against a predefined template or structure of common analytics inquiry associated with particular attributes of interest. The analytics engine 210 may further consider the contextual relationships between the identified keywords to disambiguate terms and ensure accurate recognition of the attributes of interest. Once the attributes of interest are identified, the analytics engine 210 may map the identified attributes of interest to their corresponding annotations as defined in an annotation library and/or database. Depending on the entity type, examples of attribute of interest may include sentiment, customer satisfaction level, product category, geographical location, user engagement, call duration, purchase frequency, issue resolution time, transaction amount, employee performance rating, website click-through rate, inventory levels, project completion time, social media engagement, and/or the like.

Once the analytics engine 210 identifies the attributes of interest in the analytics inquiry, the analytics engine 210 may determine one or more annotations of interest that are associated with an attribute of interest for the one or more attributes of interest. An attribute of interest corresponds to annotations that an annotation model has been trained to recognize. In some embodiments, the analytics engine 210 may use pattern matching algorithms or natural language processing techniques to compare a parsed analytics inquiry against predefined annotations associated with known attributes of interest. This may help identify the presence of specific annotations within the analytics inquiry. The analytics engine 210 may operate in conjunction with a trained and refined annotation model to identify nuanced or context-specific annotations within an analytics inquiry. Once the relevant attributes of interest are identified, the analytics engine 210 may map the identified attributes of interest to the corresponding annotations. In other words, this mapping step may connect the analytics inquiry with the specific elements the analytics engine 210 and the trained and refined annotation model are designed to analyze. In some embodiments where ambiguity arises or multiple potential annotations of the same annotation type are identified, the analytics engine 210 may seek validation or clarification by prompting entity affiliated personnel for additional information to ensure accurate identification of the attributes of interest. After identifying the annotations within the analytics inquiry, the analytics engine 210 may execute the analytics inquiry by processing and analyzing the relevant data associated with those annotations. This may be done by accessing the history recorder repository 106 and extracting the historical call transcripts with annotations matching those identified in the analytics inquiry.

In some embodiments, the analytics inquiry may be provided by entity affiliated personnel or by an automated request mechanism. Entity affiliated personnel may interact with an interactive interface provided by the communications hardware 206. The user interface may be a web portal, a dedicated application, or another interactive platform designed for analytics inquiries. Within the user interface, there may be a designated area, such as an input form or a query box, where entity affiliated personnel may enter their analytics inquiry by typing a natural language text query and/or selecting predefined options. An example analytics inquiry may be "generate a forecasted projection of demographics for English vs. Spanish callers based on the trends observed from January to July 2024". The entity affiliated personnel may submit the analytics inquiry by taking a specific action within the user interface, such as by clicking a "Submit" button, pressing "Enter", or using other interactive elements to signal that the analytics inquiry is ready for processing. This action may trigger the communications hardware 206 to transmit the analytics inquiry from the user interface to the analytics engine 210. The transmission may occur over a secure communication channel (e.g., communications network 108). By this way, the analytics engine 210 may receive an analytics inquiry from entity affiliated personnel.

In some embodiments, the analytics engine 210 may receive an analytics inquiry by way of an automated request mechanism that provides an analytics inquiry with predefined annotations. This may particularly be relevant in cases where an entity is interested in periodically generating a targeted analytics report for a fixed set of annotations. In this case, the analytics engine 210 may not need to perform additional processing and the procedure may proceed directly to operation 904.

As shown by operation 904, the apparatus 200 includes means, such as analytics engine 210, or the like, for selecting, using an analytics model, one or more annotated call transcripts based on the one or more attributes of interest. The analytics engine 210 may operate in conjunction with an analytics model to perform any of the following steps. Based on the identified attributes of interest, the analytics engine 210 may formulate a query to retrieve annotated call transcripts from history recorder repository 106 that match the specified criteria. The query may involve conditions related to the attributes of interest, such as specific values, ranges, patterns, and/or the like. The analytics engine 210 may score each identified annotated call transcript with the similar or matching attributes of interest based on its relevance to the specified attributes. This scoring mechanism may consider factors such as the frequency, intensity, or other characteristics of the attributes within the annotated call transcript. In some embodiments, a threshold may be set to filter out annotated call transcripts that fall below a certain relevance score. This helps ensure that only the most relevant annotated call transcripts meeting or exceeding a predefined level of relevance are selected. The annotated call transcripts may then be ranked or scored based on their relevance scores and be prioritized in a manner that provides higher relevance to the specified attributes of interest. In some embodiments, this may involve selecting the top N transcripts or those above a certain relevance threshold. The selected annotated call transcripts may be presented as the output of operation 904, wherein the selections may be presented in a user interface, exported to a file, or provided in a format that facilitates further analysis or review. In some embodiments, a feedback look may be established by the analytics engine 210, where entity affiliated personnel can provide input on the relevance of the selected transcripts. This feedback may be used to refine the selection process for selecting annotated call transcripts using an analytics model.

As shown by operation 906, the apparatus 200 includes means, such as analytics engine 210, or the like, for generating, using the analytics model, a targeted analytics report based on the selected one or more annotated call transcripts. The analytics engine 210 may extract pertinent data (e.g., textual information, metadata, annotations, etc.), from the selected annotated call transcripts. In addition, relevant attributes of interest may be aggregated and organized. This step may involve summarizing key information, such as frequencies, patterns, or trends related to the selected annotated call transcripts. The analytics model may be applied to the extracted data to gain deeper insights. In some embodiments, the analytics model may employ statistical analyses, machine learning algorithms, or predefined rules to identify patterns, correlations, or anomalies within the dataset. Based on the findings of the analytics model, the analytics engine 210 may generate insights and interpretations relevant to the selected annotated call transcripts. This may include identifying common themes, sentiment analysis, or any other relevant analysis based on the specified attributes. In some embodiments, visualizations such as charts, graphs, or tables, are created to represent the generated insights in a clear and understandable format. The analytics engine 210 may also construct a narrative or summary that contextualizes the insights derived from the selected annotated call transcripts by including explanations, interpretations, recommendations, etc. based on the analysis. In some embodiments, depending on preferences of the entity affiliated personnel or system requirements, the analytics engine 210 may allow for customization of the targeted analytics report where personnel are able to choose specific visualizations, filters, or parameters to tailor the analytics report to their needs. In some embodiments, the analytics engine 210 may facilitate a review or validation process, allowing users to confirm the accuracy of the generated report or provide feedback for further refinement. If applicable, the analytics engine 210 may also include actionable recommendations based on the insights derived from the selected annotated call transcripts. In some embodiments, the analytics engine 210 may also establish a feedback loop, allowing users to provide input on the report, potentially influencing future iterations of the analytics model or analysis methods.

As shown by operation 908, the apparatus 200 includes means, such as communications hardware 206, or the like, for providing the targeted analytics report. The communications hardware 206 may provide entity affiliated personnel with the targeted analytics report through an interactive interface (e.g., a web portal, custom application, or another platform designed for interacting with analytics reports). Upon logging in or navigating to the analytics section of the interface, the entity affiliated personnel may have the option to retrieve specific analytics reports. The communications hardware 206 may store or retrieve the targeted analytics report generated in response to an analytics inquiry. If stored, the communications hardware 206 may store the targeted analytics report in the history recorder repository 106. Entity affiliated personnel may select the targeted analytics report they wish to view and may be provided with an option to select based on the date, topic, or any other parameter associated with the reports available on the platform. The communications hardware 206 may present the targeted analytics report in a format suitable for consumption by the entity affiliated personnel. This may include interactive dashboards, downloadable documents (e.g., PDFs), or other visualization formats. In some embodiments, the interface may allow the user to interact with the provided targeted analytics report. This interaction may allow the entity affiliated personnel to explore specific data points, adjust parameters, or drill down into detailed insights depending on the design of the interface. In some embodiments, if the analytics model continuously processes data in real-time, the communications hardware 206 may offer real-time updates to the targeted analytics report. This ensures that entity affiliated personnel have access to the latest insights and information. In some embodiments, the communications hardware 206 may include a notification system when a new targeted analytics report becomes available or when significant changes in data occurs. Notifications may be delivered via email, in-app alerts, or other preferred communication channels. In some embodiments, the entity affiliated personnel may have the option to export or share the targeted analytics report. In particular, communications hardware 206 may provide functionalities such as exporting data to spreadsheets, generating links to share reports, or integrating with collaboration tools for seamless data sharing among team members. In addition, the communications hardware 206 may ensure the security of the analytics report, implementing measures such as entity affiliated personnel authentication and access controls to protect the data included in the targeted analytics report. In some embodiments, the communications hardware 206 may provide features for support, such as help sections, tooltips, and/or the like to assist entity affiliated personnel in navigating and interpreting the targeted analytics report. In some embodiments, entity affiliated personnel may provide feedback on the targeted analytics report directly through the interface provided by the communications hardware 206. This feedback loop may help improve the targeted analytics report generation system 102 and tailor future analytics reports to preferences of the entity-affiliated personnel and entity-based business needs.

Figure 10:
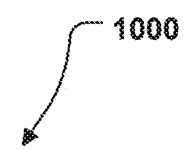
FIG. 10 illustrates an example graphical user interface for providing the targeted analytics report, used in some example embodiments described herein.
Figure 10:
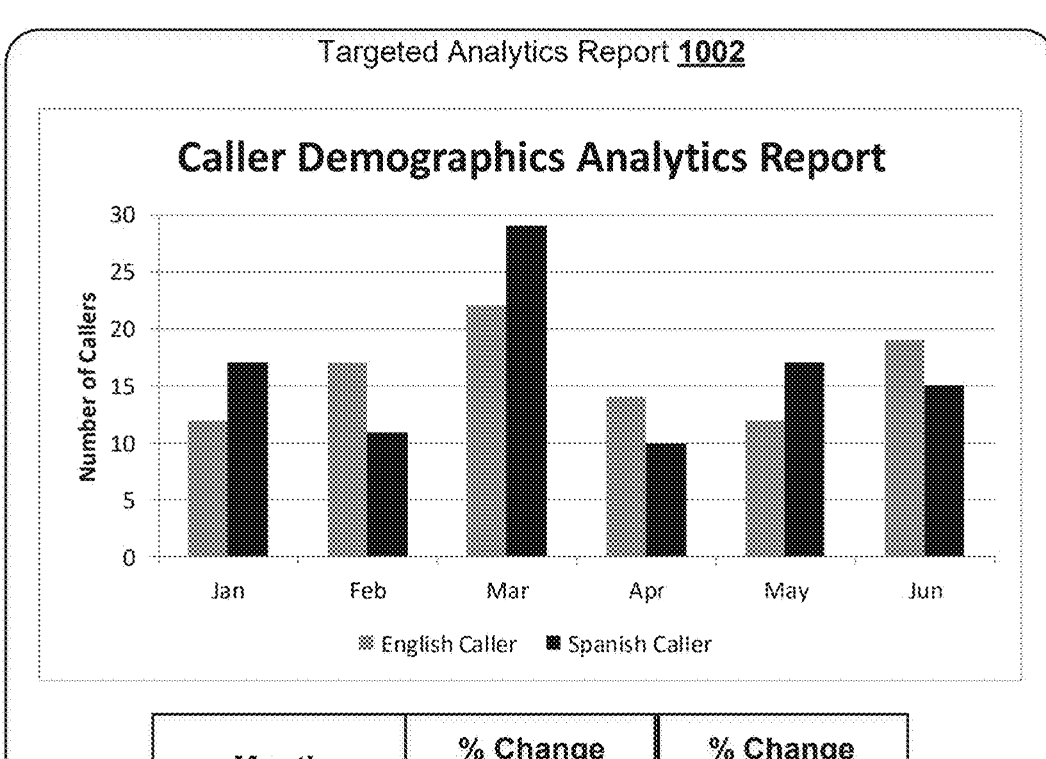

Turning now to FIG. 10, an example targeted analytics report 1002 is displayed that describes the caller demographics between English and Spanish callers from January to June of 2023. The targeted analytics report 1002 includes a bar graph visualization of the analytics report and a chart that provides the percent change in English and Spanish callers on a month-to-month basis. As shown in the targeted analytics report 1002, in some embodiments, the analytics engine 210 may also perform a forecasted projection of a targeted variable (e.g., percent change for English and Spanish callers for the month of July) and may include this information as a part of the targeted analytics report.

FIGS. 3-10 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses designed to provide a targeted analytics report. Such solutions have not previously been used and are only achievable by harnessing the computational capabilities and widespread data accessibility offered by modern internet connectivity and advances in artificial intelligence. Example embodiments tackle the inherent limitations associated with the manual analysis of call transcripts for the generation of targeted analyses. As establishments increasingly seek reliable, efficient, and adaptable solutions to address the challenges of manual methods of analysis, example embodiments offer a comprehensive approach to enhance security and operational efficiency. Further, example embodiments rely on computational methods that obviate the use of manual methods of analysis to generate a targeted analytics report, thereby eliminating the potential for human error.

As these examples all illustrate, example embodiments contemplated herein provide technical solutions that solve real-world problems faced during by entities using manual methods of analysis to generate targeted analytics reports. And while using manual methods of analysis is a common practice, the recently exploding use of digital avenues to provide phone-based assistance has increased the sheer volume and variability of call data that must be analyzed, thereby making this problem significantly more acute. Thus, example embodiments described herein unlock new avenues for automating the process of generating a targeted analytics report, effectively bridging the technological gap presented by the manual methods of analysis.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for providing a targeted analytics report, the method comprising:
receiving, by communications hardware, a call transcript, wherein the call transcript is associated with transcript metadata;
determining, by a smart engine and using an annotation model, one or more annotations for the call transcript;
annotating, by the smart engine and using the annotation model, the call transcript with the one or more annotations;
storing, by the smart engine, the annotated call transcript in a history recorder repository, wherein the history recorder repository comprises one or more annotated call transcripts;
identifying, by an analytics engine, an analytics inquiry, wherein the analytics inquiry comprises one or more attributes of interest, wherein an attribute of interest corresponds to the one or more annotations;
selecting, by the analytics engine and using an analytics model, the one or more annotated call transcripts based on the one or more attributes of interest;
generating, by the analytics engine and using the analytics model, the targeted analytics report based on the selected one or more annotated call transcripts; and
providing, by the communications hardware, the targeted analytics report.

2. The method of claim 1, further comprising:
training, by a training engine, the annotation model by:
initializing, by the training engine, a base annotation model; and
fine-tuning, by the training engine, the base annotation model using a training subset, wherein the training subset comprises (a) annotated historical call transcripts, (b) each annotated historical call transcript is annotated with one or more ground-truth annotations, and (c) each ground-truth annotation corresponds to the one or more attributes of interest.

3. The method of claim 2, further comprising:
receiving, by the training engine, one or more annotated historical call transcripts; and
partitioning, by the training engine, the one or more annotated historical call transcripts into the training subset and a validation subset.

4. The method of claim 3, further comprising:
fine-tuning, by the training engine and using the validation subset, the annotation model by:
generating, by the training engine and using the annotation model, one or more model-generated annotations for a historical call transcript in the validation subset; and
fine-tuning, by the training engine, the annotation model based on a comparison of the one or more model-generated annotations and the one or more ground-truth annotations for the historical call transcript in the validation subset.

5. The method of claim 3, further comprising:
fine-tuning, by the training engine and using the validation subset, the annotation model by:
generating, by the training engine and using the annotation model, one or more model-generated annotations for a historical call transcript in the validation subset;
outputting, by the communications hardware, the one or more model-generated annotations for the historical call transcript;
receiving, by the communications hardware, user feedback comprising a confirmation or a rejection of the one or more model-generated annotations; and
fine-tuning, by the training engine and using the annotation model, the annotation model based on the user feedback.

6. The method of claim 1, wherein identifying the analytics inquiry further comprises:
receiving, by the communications hardware, the analytics inquiry from personnel or by an automated request mechanism; and
identifying the analytics inquiry in response to receiving the analytics inquiry.

7. The method of claim 1, further comprising:
determining, by the smart engine, whether an annotation determined for the call transcript corresponds to a flagged annotation; and
in an instance in which the annotation corresponds to the flagged annotation, providing, by the communications hardware, an alert indicating that the call transcript has been flagged.

8. The method of claim 1, wherein the call transcript is received while a corresponding call is ongoing.

9. An apparatus for providing a targeted analytics report, the apparatus comprising:
communications hardware configured to receive a call transcript, wherein the call transcript is associated with transcript metadata;
a smart engine configured to:
determine using an annotation model, one or more annotations for the call transcript,
annotate, using the annotation model, the call transcript with the one or more annotations, and
store the annotated call transcript in a history recorder repository, wherein the history recorder repository comprises one or more annotated call transcripts; and
an analytics engine configured to:
identify an analytics inquiry, wherein the analytics inquiry comprises one or more attributes of interest, wherein an attribute of interest corresponds to the one or more annotations,
select, using an analytics model, the one or more annotated call transcripts based on the one or more attributes of interest, and
generate, using the analytics model, the targeted analytics report based on the selected one or more annotated call transcripts,
wherein the communications hardware is further configured to provide the targeted analytics report.

10. The apparatus of claim 9, further comprising:
a training engine configured to train the annotation model by:
initializing a base annotation model; and
fine-tuning the base annotation model using a training subset, wherein the training subset comprises (a) annotated historical call transcripts, (b) each annotated historical call transcript is annotated with one or more ground-truth annotations, and (c) each ground-truth annotation corresponds to the one or more attributes of interest.

11. The apparatus of claim 10, wherein the training engine is further configured to:

receive one or more annotated historical call transcripts; and partition the one or more annotated historical call transcripts into the training subset and a validation subset.

12. The apparatus of claim 11, wherein the training engine is further configured to:

fine-tune, using the validation subset, the annotation model by:

generating, using the annotation model, one or more model-generated annotations for a historical call transcript in the validation subset; and fine-tuning the annotation model based on a comparison of the one or more model-generated annotations and the one or more ground-truth annotations for the historical call transcript in the validation subset.

13. The apparatus of claim 11, wherein the training engine is further configured to:

fine-tune, using the validation subset, the annotation model by generating, using the annotation model, one or more model-generated annotations for a historical call transcript in the validation subset, wherein the communications hardware is further configured to:

output the one or more model-generated annotations for the historical call transcript; and receive personnel feedback comprising a confirmation or a rejection of the one or more model-generated annotations, wherein the training engine is further configured to fine-tune the annotation model based on the personnel feedback.

14. The apparatus of claim 9, wherein the communications hardware is further configured to:

receive the analytics inquiry, from personnel or by an automated request mechanism; and identify the analytics inquiry in response to receiving the analytics inquiry.

15. The apparatus of claim 9, wherein the smart engine is further configured to determine whether an annotation determined for the call transcript corresponds to a flagged annotation, wherein the communications hardware is further configured to, in an instance in which the annotation corresponds to the flagged annotation, provide an alert indicating that the call transcript has been flagged.

16. A computer program product for providing a targeted analytics report, the computer program product comprising at least one non-transitory computer readable storage medium storing software instructions that, when executed, cause an apparatus to:

receive a call transcript, wherein the call transcript is associated with transcript metadata;

determine, using an annotation model, one or more annotations for the call transcript;

annotate, using the annotation model, the call transcript with the one or more annotations;

store, the annotated call transcript in a history recorder repository, wherein the history recorder repository comprises one or more annotated call transcripts;

identify an analytics inquiry, wherein the analytics inquiry comprises one or more attributes of interest, wherein an attribute of interest corresponds to the one or more annotations;

select, using an analytics model, the one or more annotated call transcripts based on the one or more attributes of interest;

generate, using the analytics model, the targeted analytics report based on the selected one or more annotated call transcripts; and provide the targeted analytics report.

17. The computer program product of claim 16, wherein the software instructions, when executed, further cause the apparatus to:

train the annotation model by:

initializing a base annotation model; and fine-tuning the base annotation model using a training subset, wherein the training subset comprises (a) annotated historical call transcripts, (b) each annotated historical call transcript is annotated with one or more ground-truth annotations, and (c) each ground-truth annotation corresponds to the one or more attributes of interest.

18. The computer program product of claim 17, wherein the software instructions, when executed, further cause the apparatus to:

receive one or more annotated historical call transcripts; and partition the one or more annotated historical call transcripts into the training subset and a validation subset.

19. The computer program product of claim 18, wherein the software instructions, when executed, further cause the apparatus to:

fine-tune, using the validation subset, the annotation model by:

generating, using the annotation model, one or more model-generated annotations for a historical call transcript in the validation subset; and fine-tuning the annotation model based on a comparison of the one or more model-generated annotations and the one or more ground-truth annotations for the historical call transcript in the validation subset.

20. The computer program product of claim 18, wherein the software instructions, when executed, further cause the apparatus to:

fine-tune, using the validation subset, the annotation model by:

generating, using the annotation model, one or more model-generated annotations for a historical call transcript in the validation subset;

outputting the one or more model-generated annotations for the historical call transcript;

receiving personnel feedback comprising a confirmation or a rejection of the one or more model-generated annotations; and fine-tuning the annotation model based on the personnel feedback.

* * * * *